(12) United States Patent
Izumi

(10) Patent No.: US 6,288,800 B1
(45) Date of Patent: Sep. 11, 2001

(54) IMAGE COMMUNICATION SYSTEM CAPABLE OF VISUALLY OUTPUTTING IMAGE DATA OF IMAGE INPUT APPARATUS AND TRANSMITTING IMAGE DATA TO COMMUNICATION LINE, AND METHOD OF CONTROLLING THE SAME

(75) Inventor: Michihiro Izumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/982,924

(22) Filed: Dec. 2, 1997

(30) Foreign Application Priority Data

Dec. 6, 1996 (JP) .................................................. 8-326771

(51) Int. Cl.[7] ....................................................... H04N 1/32
(52) U.S. Cl. ........................................... 358/468; 358/442
(58) Field of Search ..................................... 358/468, 479, 358/442, 445, 448; 395/112, 114; 370/337, 347

(56) References Cited

U.S. PATENT DOCUMENTS 5,550,646 * 8/1996 Hassan et al. ........................ 358/442
5,815,205 * 9/1998 Hashimoto et al. .................. 348/373

* cited by examiner

Primary Examiner—Cheukfan Lee
(74) Attorney, Agent, or Firm—Fitzpatrick, Cella, Harper & Scinto

(57) ABSTRACT

An image communication system includes a communication apparatus with a communication system for performing communication via a communication line and a visual output device for visually outputting an image, and an image input apparatus for inputting an image. Different control signals are transmitted from the image input apparatus to the communication apparatus depending on a case in which image data is visually output and a case in which the image data is transmitted via the communication line.

113 Claims, 14 Drawing Sheets

CONSTRUCTION OF FACSIMILE APPARATUS OF FIRST EMBODIMENT

CONSTRUCTION OF DIGITAL CAMERA OF FIRST EMBODIMENT

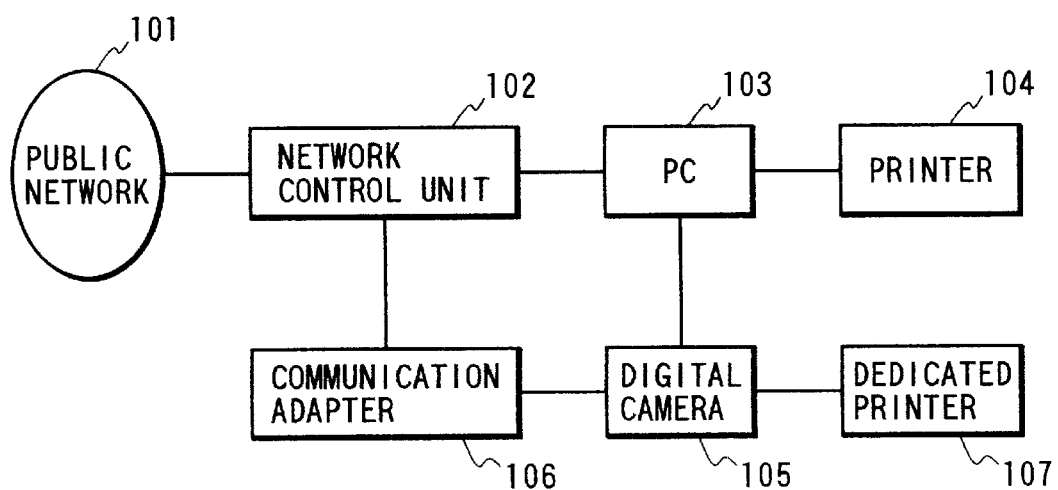
CONSTRUCTION OF PRIOR ART
IMAGE COMMUNICATION SYSTEM
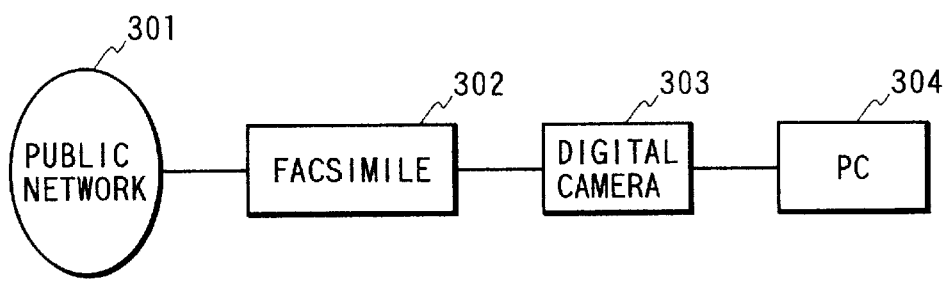
FIRST EMBODIMENT OF IMAGE
COMMUNICATION SYSTEM

CONSTRUCTION OF PRIOR ART DIGITAL CAMERA

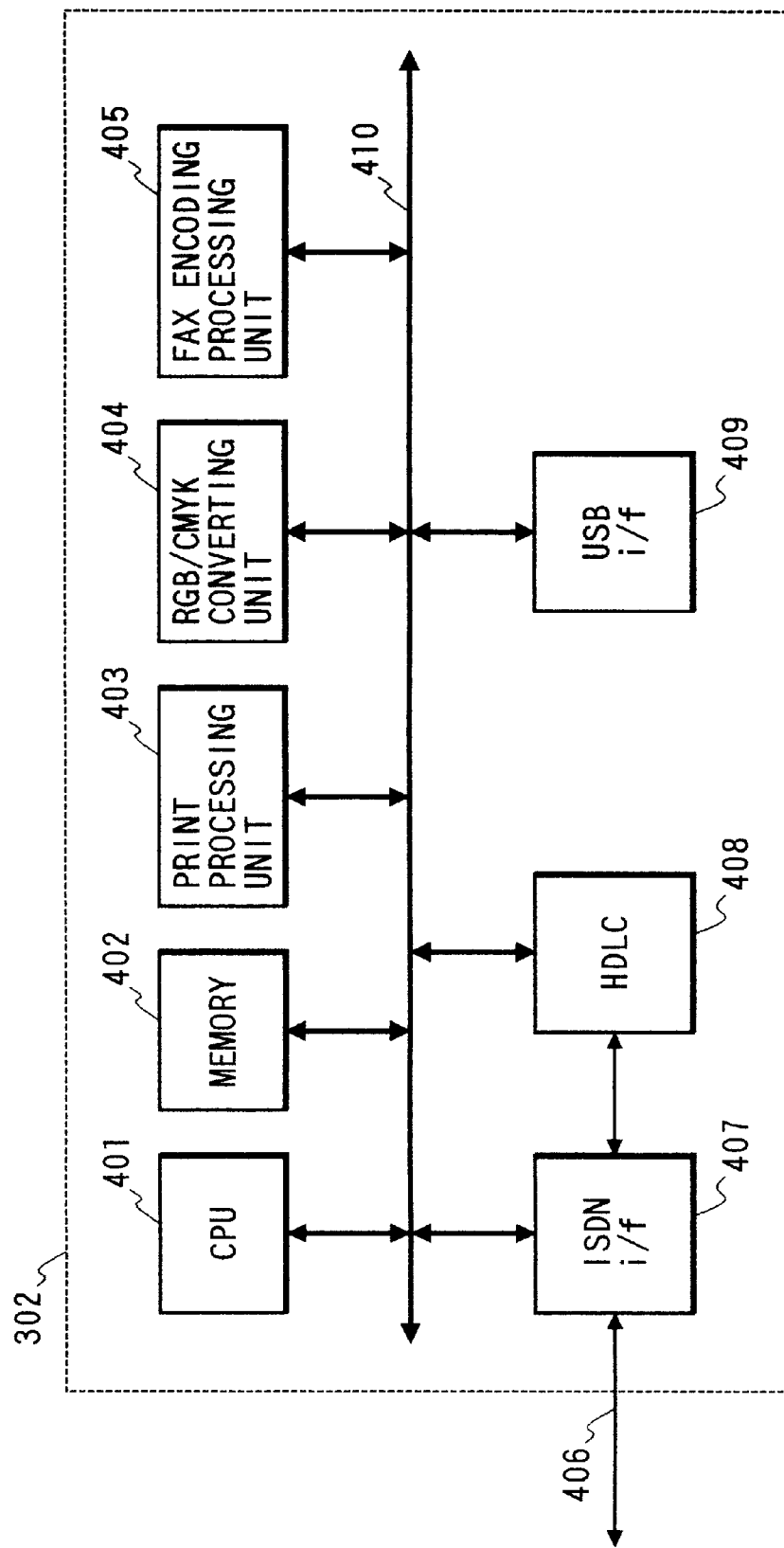

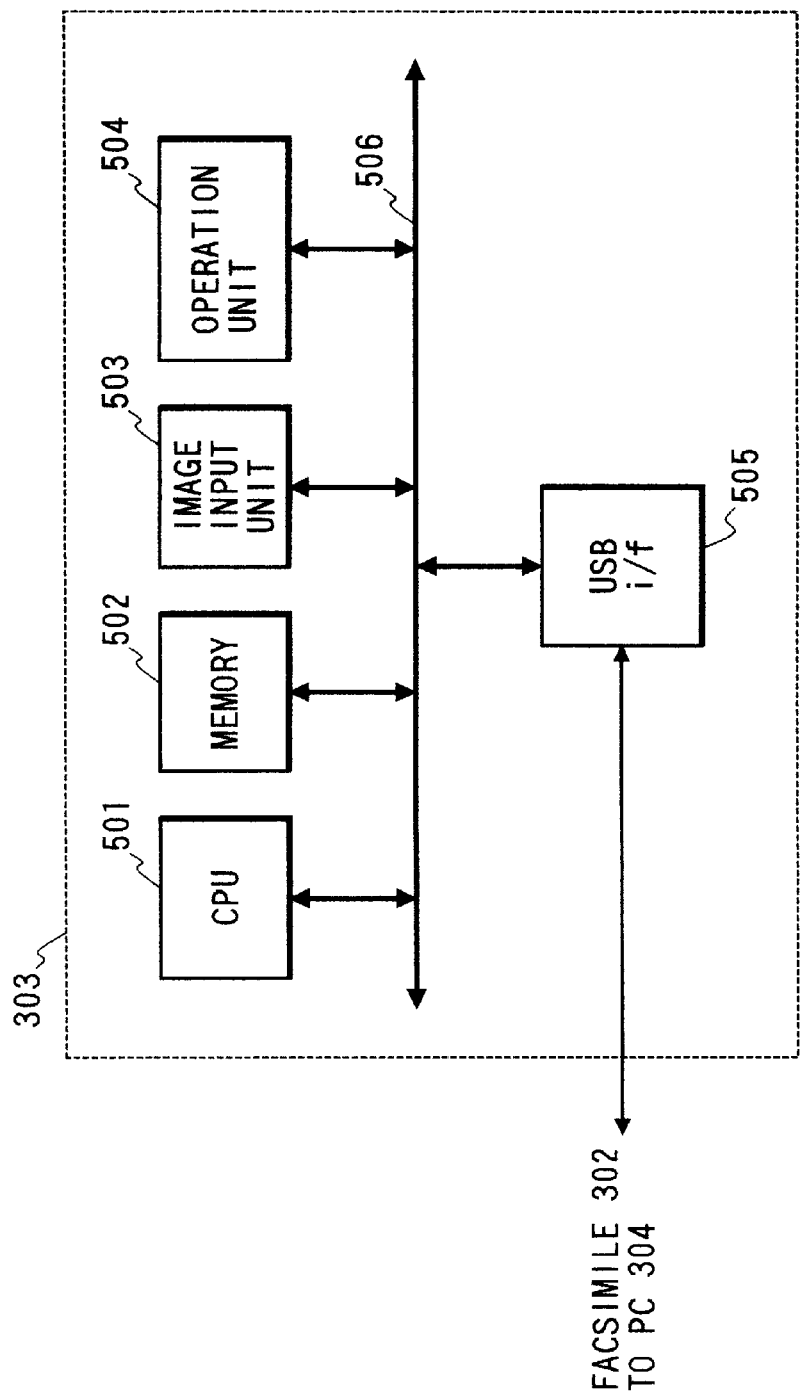

SECOND EMBODIMENT OF IMAGE COMMUNICATION SYSTEM

CONSTRUCTION OF DIGITAL CAMERA OF SECOND EMBODIMENT

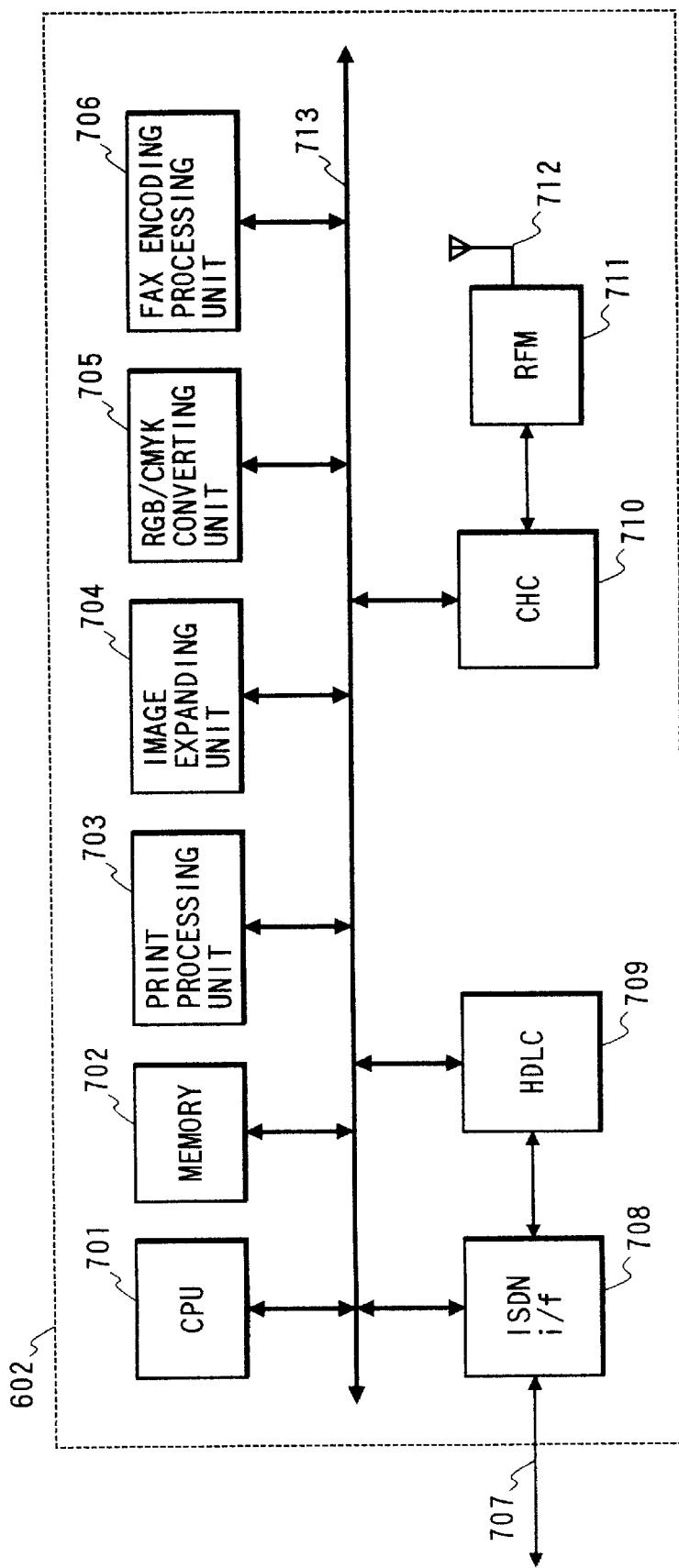

OPERATION FLOW CHART OF FIRST EMBODIMENT

OPERATION FLOW CHART OF SECOND EMBODIMENT

CONCEPTUAL VIEW OF FRAME CONFIGURATION OF USB

OPERATION FLOW CHART OF THIRD EMBODIMENT

US 6,288,800 B1

IMAGE COMMUNICATION SYSTEM CAPABLE OF VISUALLY OUTPUTTING IMAGE DATA OF IMAGE INPUT APPARATUS AND TRANSMITTING IMAGE DATA TO COMMUNICATION LINE, AND METHOD OF CONTROLLING THE SAME

BACKGROUND OF THE INVENTION

1. Field of the Invention

The present invention relates to an image communication system capable of visually outputting image data of an image input apparatus and transmitting the image data to a communication line, and a method of controlling the same.

2. Related Background Art

Conventionally, an image photographed by an image input apparatus such as a digital camera is color-printed or sent to a remote partner. FIG. 1 shows the construction of such a prior art image communication system. In FIG. 1, the image communication system comprises a public network 101, a network control unit 102 such as a modem or a terminal adapter, a personal computer (PC) 103, a PC printer 104, a digital camera 105, a communication adapter 106, and a printer 107 dedicated to the digital camera.

FIG. 2 is a block diagram of the construction of the digital camera 105. In FIG. 2, the digital camera 105 comprises a CPU 201, a memory 202, an image input unit 203, an operation unit 204, a PC interface 205, a printer interface 206, a communication adapter interface 207, and a data bus 208.

When an image photographed by the digital camera 105 is to be printed, image data stored in the memory 202 of the digital camera 105 can be received by the personal computer 103 via the PC interface 205 and then output to the PC printer 104 using application software of the personal computer 103.

When image data is to be transmitted, the image data is temporarily received in the personal computer 103, and compressed by application software of the personal computer. The compressed data is transmitted to the network control unit 102, and then to a communication line via the network control unit 102.

By this method, an image photographed by the digital camera can be printed or transmitted via the communication line.

In the absence of the personal computer, the digital camera is directly connected to the dedicated printer 106 or a dedicated modem via the printer interface 206 or the communication adapter interface 207 to print an image or transmit it to the communication line.

In some cases, the digital camera and the printer or the modem are connected to each other via a wireless channel or radio channel.

In this arrangement, the same wireless channel is used to transmit data to the printer and transmit data to the communication line via the modem.

However, when the digital camera is connected to the printer and the modem via a wire, the digital camera must comprise printer and modem interfaces. In addition, if the printer and the modem are not installed near the digital camera, connection between the digital camera and the printer or the modem must be switched.

When the digital camera is connected to the printer or the modem via a wireless channel, if a wireless communication channel having a high transmission rate is used, data can be efficiently transmitted to a printer to which a large amount of data must be sent. However, even when data can be compressed in, e.g., accessing a public network such as ISDN (Integrated Services Digital Network) or PSTN (Public Switched Telephone Network), a wireless communication channel having the same transmission rate as that in transmitting data to the printer is undesirably occupied.

If the digital camera is connected to the printer or the modem using a wireless communication channel having a low transmission rate in consideration of an access to the public network such as ISDN or PSTN, when a large amount of data is needed to be transmitted to the printer, the large amount of data can only be transmitted at a low rate.

SUMMARY OF THE INVENTION

It is an object of the present invention to enable an operation of visually outputting image data of an image input apparatus and transmitting it to a communication line by simple processing.

It is another object of the present invention to efficiently use a wireless channel in accordance with an image data use method when the image input apparatus is connected to a communication apparatus capable of visually outputting image data via a wireless channel.

It is still another object of the present invention to efficiently utilize a communication line by using the feature of a USB (Universal Serial Bus) capable of simultaneously transferring data demanded for high-speed communication and data demanded for real-time communication.

It is still another object of the present invention to use a high speed data transferable bulk transfer slot when, e.g., image data is to be printed, and use a real-time transferable isochronous transfer slot when, e.g., data is to be transmitted to a communication line.

The above and other objects, features, and advantages of the present invention will be apparent from the following description in conjunction with the accompanying drawings.

BRIEF DESCRIPTION OF THE DRAWINGS

FIG. 1 is a block diagram of the construction of a prior art image communication system;

FIG. 3 is a block diagram of the construction of an image communication system according to the first embodiment;

FIG. 4 is a block diagram of the construction of a facsimile apparatus in the image communication system according to the first embodiment;

FIG. 5 is a block diagram of the construction of a digital camera in the image communication system according to the first embodiment;

FIG. 7 is a block diagram of the construction of a facsimile apparatus in the wireless image communication system according to the second embodiment;

DESCRIPTION OF THE PREFERRED EMBODIMENTS

First Embodiment

Figure 2:
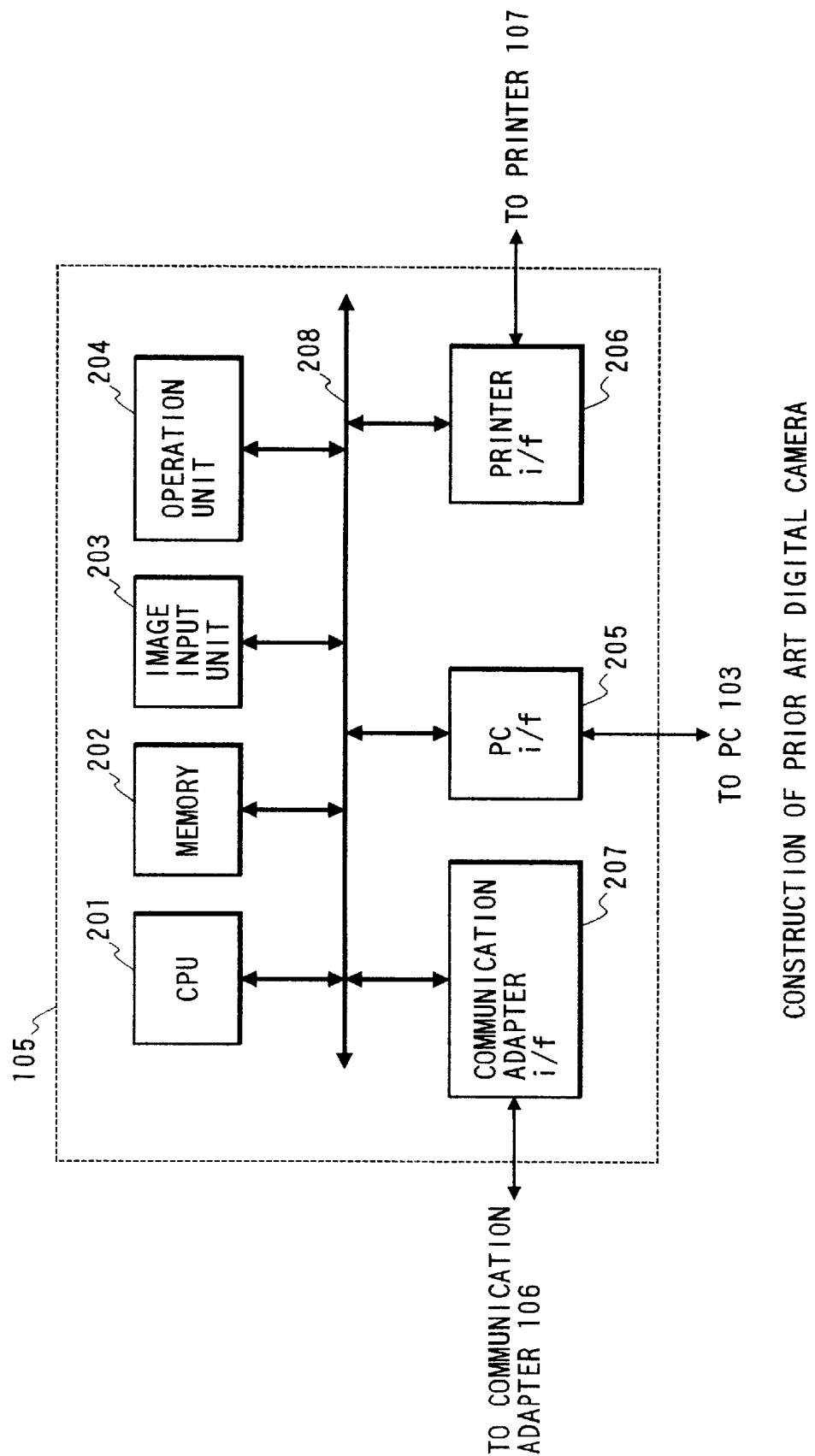
FIG. 2 is a block diagram of the construction of a digital camera in the prior art image communication system.

FIG. 3 is a block diagram showing the system construction of the first embodiment. In FIG. 3, the system comprises a public network (ISDN: Integrated Services Digital Network) 301, a facsimile apparatus 302 having a communication function of performing communication via the public network 301, and a print function of printing an image, a digital camera 303 for inputting an image, and a personal computer 304. The facsimile apparatus 302, the digital camera 303, and the personal computer 304 are connected via a USB (Universal Serial Bus) cable.

FIG. 4 is a block diagram of the construction of the facsimile apparatus constituting the image communication system according to the first embodiment of the present invention. In FIG. 4, the facsimile apparatus comprises a CPU 401 for controlling the entire apparatus in accordance with a program stored in a memory (not shown) such as a RAM, a memory 402, a print processing unit 403 for performing data conversion, motor control, and the like for printing, an RGB/CMYK converting unit 404 for converting RGB (Red, Green, Blue) image data into CMYK (Cyan, Magenta, Yellow, blacK) image data, a FAX encoding processing unit 405 for compressing and encoding image data to be transmitted to a communication line, an ISDN line 406, an ISDN interface 407 for assembling/disassembling an ISDN transmission data frame, an HDLC (High level Data Link Control procedures) controller 408 for assembling the frame of image data to be transmitted, a USB (Universal Serial Bus) interface 409 serving as a communication interface connected to the digital camera, and a data bus 410.

FIG. 5 is a block diagram of the construction of the digital camera 303 constituting the image communication system according to the first embodiment of the present invention. In FIG. 5, the digital camera 303 comprises a CPU 501 for controlling the entire apparatus in accordance with a program stored in a memory (not shown) such as a RAM, a memory 502, an image input unit 503, an operation unit 504, a USB interface 505, and a data bus 506.

Figure 11:
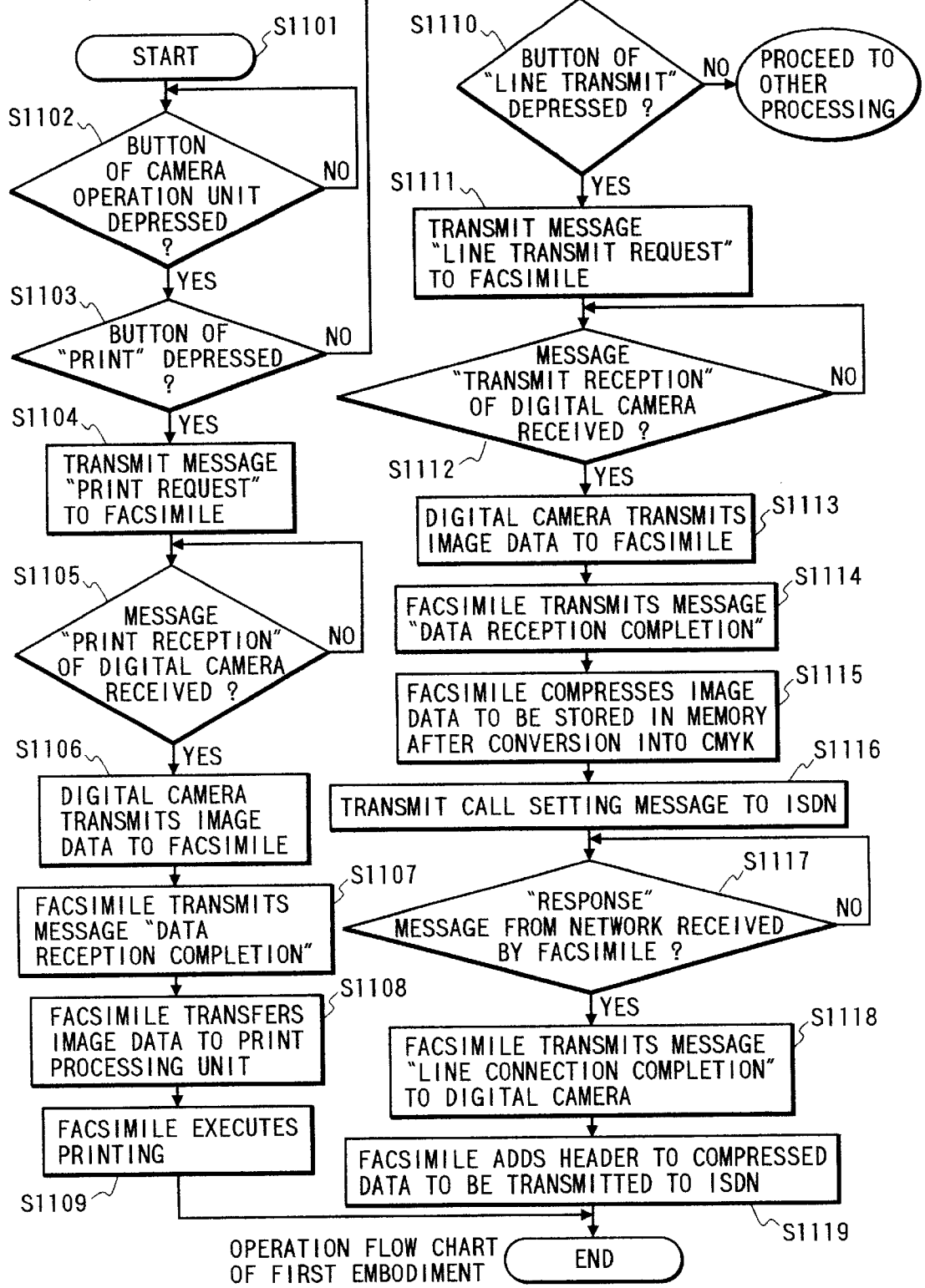
FIG. 11 is a flow chart of the operation of the image communication system according to the first embodiment.

Processing when image data photographed by the digital camera 303 is to be color-printed by the facsimile apparatus 302, and processing when the image data is transmitted to the ISDN 301 via the facsimile apparatus 302 will be explained below with reference to FIG. 11.

When image data of the digital camera 303 is to be color-printed, if the CPU 501 of the digital camera 303 detects that a button of the operation unit 504 is depressed (S1102), and that the button is a button of "print" (S1103), the digital camera 303 transmits a message "print request" to the facsimile apparatus 302 via the USB interface 505 of the digital camera 303 and the USB interface 409 of the facsimile apparatus 302 (S1104). Upon detecting the reception of the message "print request", the CPU 401 of the facsimile apparatus 302 transmits a message "print reception" to the digital camera 303 if the facsimile apparatus 302 is in a printable state. If the facsimile apparatus 302 cannot print data due to the absence of paper sheets or the like, the CPU 401 transmits a message "print disable" to the digital camera 303 to inform the digital camera 303 of a printer function error.

Upon detecting the reception of the message "print reception" (S1105), the CPU 501 of the digital camera 303 starts transmitting data to the facsimile apparatus 302 (S1106). The digital camera 303 has image data having a resolution of 640 pixels×480 pixels. When image data is printed using three colors, i.e., R, G, and B, the data amount is 640×480×3=921.6 kbytes (KB). Considering the effective transmission rate of the USB=about 10 Mbps, the transmission time is 921.6/(10,000/8)=0.74 sec.

Upon reception of this image data, the CPU 401 of the facsimile apparatus 302 stores the received data in the memory 402, and transmits a message "data reception completion" to the digital camera (S1107).

The CPU 401 of the facsimile apparatus 302 transfers the image data stored in the memory 402 to the print processing unit 403, and causes the print processing unit 403 to control the printer head, printing the image data (S1108). Upon completion of the printing, the CPU 401 transmits a message "print completion" to the digital camera 303 to end the printing (S1109). When image data of the digital camera 303 is transmitted to a remote partner connected via the ISDN, if the CPU 501 of the digital camera 303 detects that a button of "line transmit" of the operation unit 504 is depressed (S1110), the digital camera 303 transmits a message "line transmit request" to the facsimile apparatus 302 (S1111). Upon detecting the reception of the message "line transmit request", the CPU 401 of the facsimile apparatus 302 transmits a message "line transmit request reception" to the digital camera 303 (S1112).

Upon detecting the reception of the message "line transmit request reception", the CPU 501 of the digital camera 303 starts transmitting image data to the facsimile apparatus 302 (S1113). Upon reception of the image data, the CPU 401 of the facsimile apparatus 302 stores the received data in the memory 402, and transmits a message "data reception completion" to the digital camera (S1114).

To shorten the communication time, the CPU 401 of the facsimile apparatus 302 converts the image data stored in the memory 402 into CMYK data using the RGB/CMYK converting unit 404, and then transfers the CMYK data to the FAX encoding processing unit 405 to compress the image (S1115). The image compression is performed by the JPEG (Joint Photograph coding Experts Group) scheme. The data amount is compressed to about ⅛, which corresponds to about 115.2 kbytes. The compressed image data is stored in the memory 402 again.

The CPU 401 of the facsimile apparatus 302 transmits a call setting message to the ISDN 301 to perform originating processing (S1116). If the partner terminal responds, and the CPU 401 of the facsimile apparatus 302 detects the reception of a response message from the ISDN 301 (S1117), the CPU 401 of the facsimile apparatus 302 transmits a message "line connection completion" to the digital camera 303 (S1118).

The CPU 401 of the facsimile apparatus 302 adds a header in accordance with a predetermined protocol to the compressed image data stored in the memory 402, and transfers the image data to the HDLC controller 408, which adds an HDLC header to the image data. The obtained data is assembled into an ISDN frame by the ISDN interface 407, and transmitted on a channel B1 (S1119).

Since the data amount upon compression is about 115.2 kbytes, the data can be transmitted within about 14.4 sec at a transmission rate of 64 kbps.

By changing the operation of the digital camera in the above manner, data can be printed out and transmitted to a communication line via the facsimile apparatus without transferring the data to a personal computer or connecting the digital camera to a dedicated apparatus.

Second Embodiment

The first embodiment assumes that the digital camera and the facsimile apparatus are connected via the USB serial cable. To realize a more usable environment, however, the digital camera and the facsimile apparatus are connected via a wireless channel.

Figure 6:
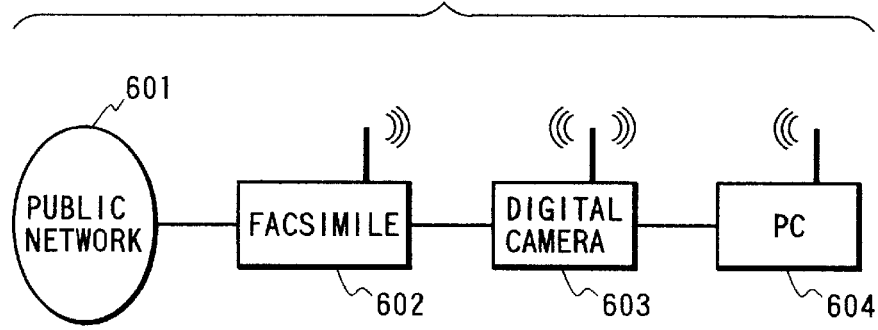
FIG. 6 is a block diagram of the construction of a wireless image communication system according to the second embodiment.

FIG. 6 is a block diagram of the construction of a wireless image communication system according to the second embodiment of the present invention. In FIG. 6, the system comprises a public network (ISDN: Integrated Services Digital Network) 601, a facsimile apparatus 602, a digital camera 603, and a personal computer 604.

FIG. 7 is a block diagram of the construction of the facsimile apparatus constituting the wireless image communication system according to the second embodiment of the present invention. In FIG. 7, the facsimile apparatus comprises a CPU 701 for controlling the entire apparatus in accordance with a program stored in a memory (not shown) such as a RAM, a memory 702, a print processing unit 703 for performing data conversion, motor control, and the like for printing, an image expanding unit 704, an RGB/CMYK converting unit 705, a FAX encoding processing unit 706, an ISDN line 707, an ISDN interface 708, an HDLC controller 709, a channel codec 710 for assembling/disassembling the wireless frame, a wireless module 711 constituted by a radio-frequency circuit, a modulating/demodulating circuit, and the like, an antenna 712, and a data bus 713.

Figure 8:
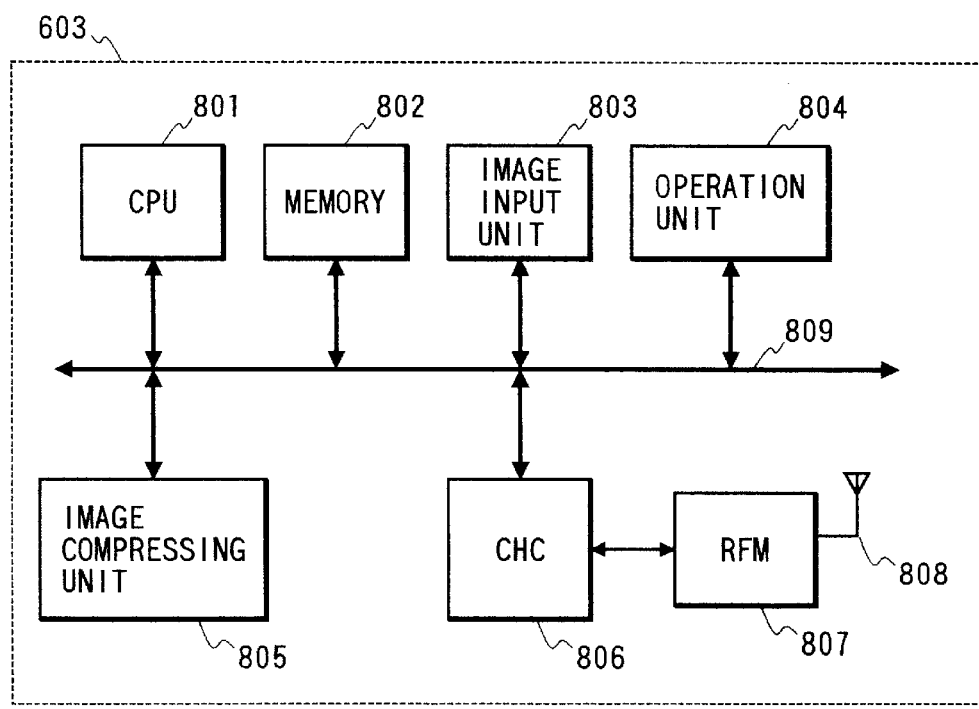
FIG. 8 is a block diagram of the construction of a digital camera in the wireless image communication system according to the second embodiment.

FIG. 8 is a block diagram of the construction of the digital camera constituting the wireless image communication system according to the second embodiment of the present invention. In FIG. 8, the digital camera comprises a CPU 801 for controlling the entire apparatus in accordance with a program stored in a memory (not shown) such as a RAM, a memory 802, an image input unit 803, an operation unit 804, an image compressing unit 805, a channel codec 806 for assembling/disassembling the wireless frame, a wireless module 807 constituted by a radio-frequency circuit, a modulating/demodulating circuit, and the like, an antenna 808, and a data bus 809.

Figure 9:
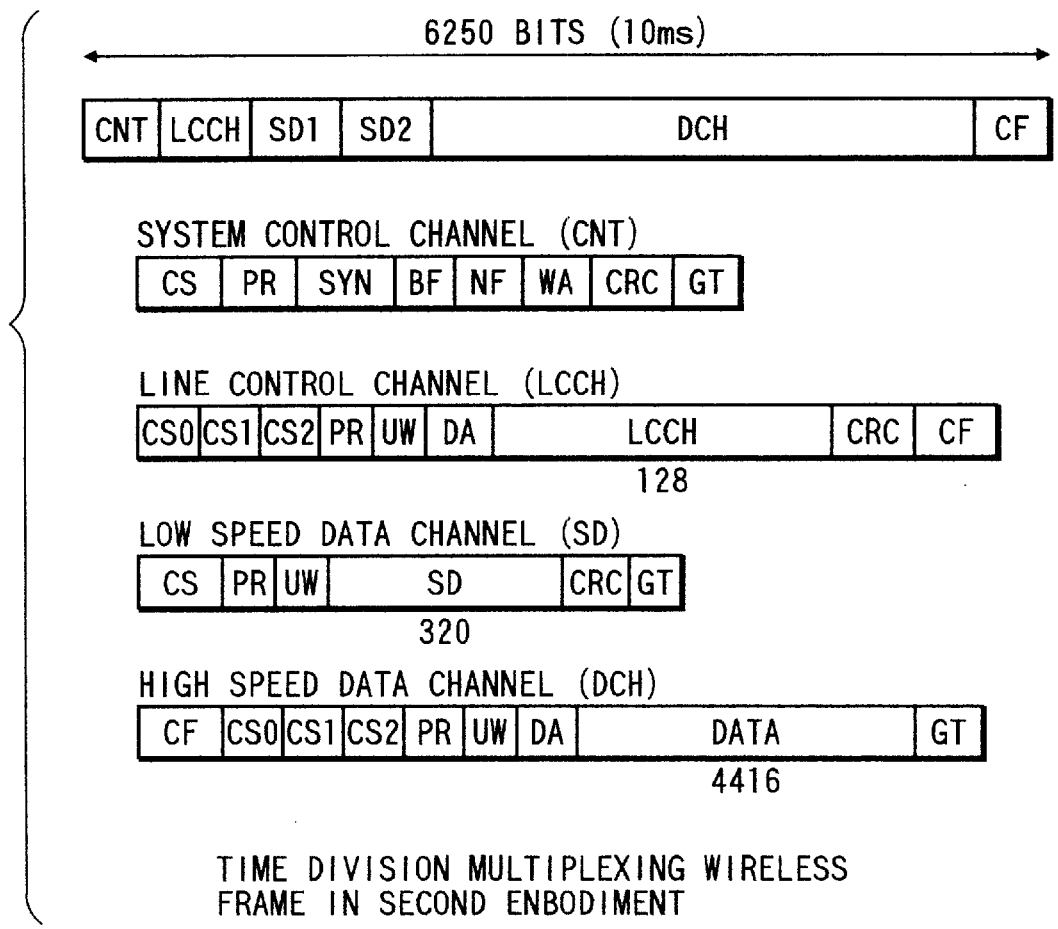
FIG. 9 is a view of the wireless frame format in the wireless image communication system according to the second embodiment.

FIG. 9 shows the frame format of the wireless channel of the wireless image communication system according to the second embodiment of the present invention. In FIG. 9, one frame has a length of 6,250 bits (10 ms), and is constituted by a total of five time division multiplexing channels: a CNT (system control) channel, an LCCH (Logic Control CHannel) channel, two SD (low speed data channel) channels, and a DCH (Data CHannel), and three frequency switching sections for frequency hopping.

The CNT channel is made up of a carrier sense portion (CS), a preamble portion (PR), a frame sync word portion (SYN) for allowing a reception terminal to hold frame synchronization, a frame number information portion (BF) used to control a hopping pattern, a next frame frequency number portion (NF), an intermittent terminal activating address portion (WA) for activating a terminal intermittently receiving data, a CRC portion (CRC) for detecting an error, and a guard time (GT).

The LCCH channel has carrier sense portions (CS0, CS1, CS2), a preamble portion (PR), a unique word portion (UW), a transmission destination address portion (DA), an LCCH control data portion (LCCH), a CRC portion (CRC), and a frequency switching portion (CF).

The low speed data channel is made up of a carrier sense portion (CS), a preamble portion (PR), a unique word portion (UW), a low speed data portion (SD), a CRC portion (CRC), and a guard time (GT).

The high speed data channel is constituted by carrier sense portions (CS0, CS1, CS2), a preamble portion (PR), a unique word portion (UW), a transmission destination address portion (DA), a data portion (DATA), and a guard time (GT).

In this frame, the low speed data channel has a transmission rate of 32 kbps, and the high speed data channel, a transmission rate of 441.6 kbps. Data is transmitted by a spectrum spread communication scheme using a 2.4-GHz band.

Figure 12:
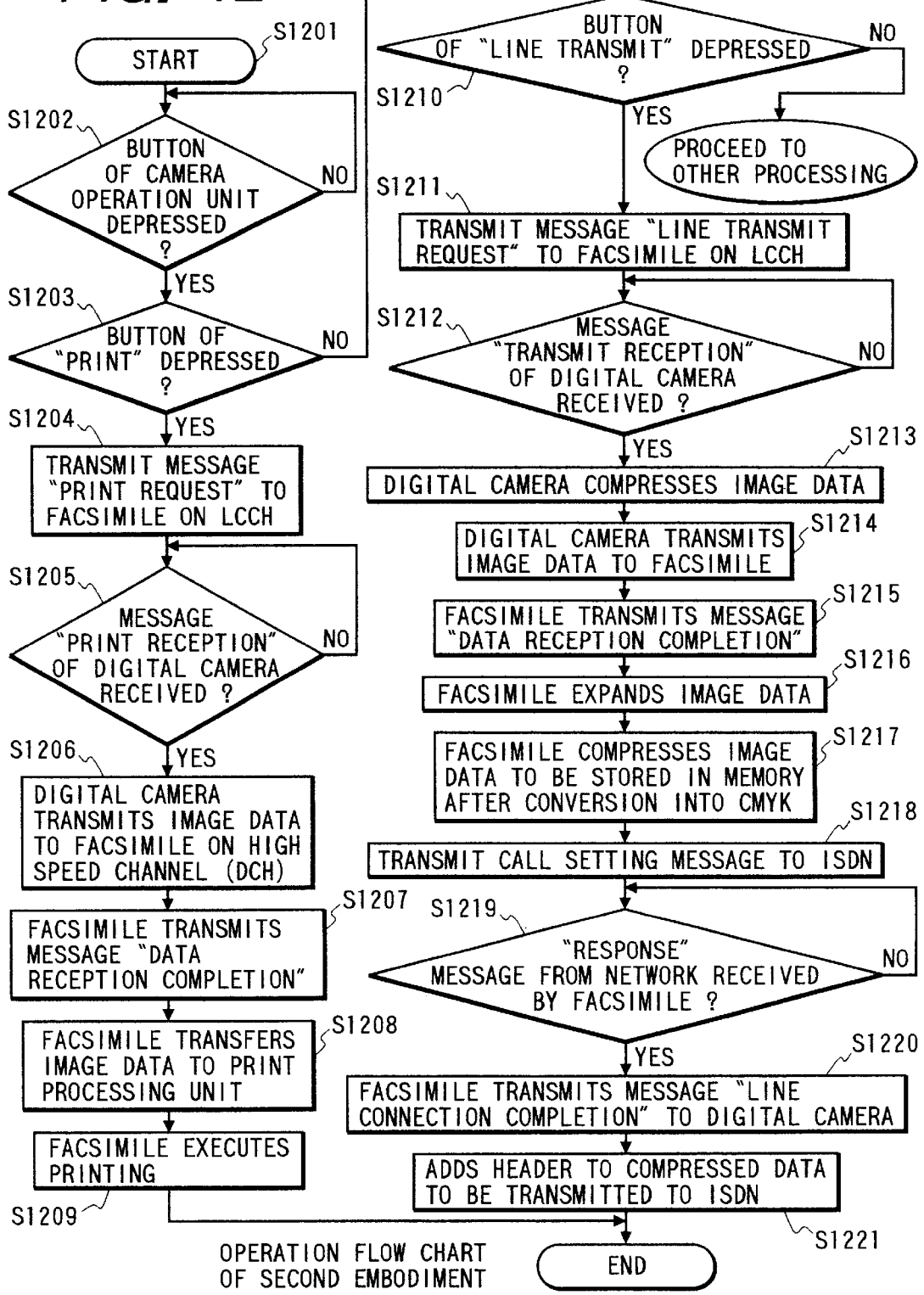
FIG. 12 is a flow chart of the operation of the wireless image communication system according to the second embodiment.

Processing when image data photographed by the digital camera 603 is to be color-printed by the facsimile apparatus 602 via a wireless channel, and processing when the image data is to be transmitted to the ISDN 601 via the facsimile apparatus 602 will be explained below with reference to FIG. 12.

When image data of the digital camera 603 is to be color-printed, if the CPU 801 of the digital camera 603 detects that a button of the operation unit 804 is depressed (S1202), and that the button is a button of "print" (S1203), the digital camera 603 transmits a message "print request" to the facsimile apparatus 602 (S1204). In transmitting the message, the CPU 801 of the digital camera 603 encodes the message, and writes the encoded message in the channel codec 806. The channel codec 806 sends the data in the LCH field of the frame format shown in FIG. 9 to transmit the data as a radio wave via the wireless module 807 and the antenna 808.

The CPU 701 of the facsimile apparatus 602 receives the radio wave via the antenna 712 and the wireless module 711, disassembles the received frame in the channel codec 710, and extracts and reads the data set in the LCCH field.

When the CPU 701 of the facsimile apparatus 602 recognizes that the received message is the message "print request", if the facsimile apparatus 602 is in a printable state, the CPU 701 transmits a message "print reception" to the digital camera 603 using the LCCH field. If the facsimile apparatus 602 cannot print data due to the absence of paper sheets or the like, the CPU 701 transmits a message "print disable" to the digital camera 603 to inform the digital camera 603 of a printer function error.

Upon detecting the reception of the message "print reception" (S1205), the CPU 801 of the digital camera 603 starts transmitting data to the facsimile apparatus 602 (S1206). Image data to be printed is transmitted in the DCH field of the wireless frame. As described in the first embodiment, since the data amount is 640×480×3=921.6 kbytes (KB), and the transmission rate of the DCH field is 441.6 kbps, the data is transmitted within 821.6/(441.6/816.7)=16.7 sec. Upon reception of the image data, the CPU 701 of the facsimile apparatus 602 stores the received data in the memory 702, and transmits a message "data reception completion" to the digital camera in the LCCH field (S1207).

The CPU 701 of the facsimile apparatus 602 transfers the image data stored in the memory 702 to the print processing unit 703, and causes the print processing unit 703 to control the printer head, printing the image data (S1208). Upon completion of the printing, the CPU 701 transmits a message "print completion" to the digital camera 603 in the LCCH field to end the printing (S1209).

When image data of the digital camera 603 is transmitted to a remote partner connected via the ISDN 601, if the CPU 801 of the digital camera 603 detects that a button of "line transmit" of the operation unit 804 is depressed (S1210), the digital camera 603 transmits a message "line transmit request" to the facsimile apparatus 602 in the LCCH field (S1211). Upon receiving the message "line transmit request", the CPU 701 of the facsimile apparatus 602 transmits a message "line transmit request reception" to the digital camera 603. Upon detecting the reception of the message "line transmit request reception" (S1212), the CPU 801 of the digital camera 603 performs JPEG compression for the image data to the facsimile apparatus 602 by the image compressing unit 805 to compress the image data to a data amount of about 115.2 kbytes (S1213). The CPU 801 writes the compressed data in the channel codec 806, and causes the channel codec 806 to output the data in the SD field of the wireless frame at a transmission rate of 32 kbps. The CPU 801 further transmits the data as a radio wave via the wireless module 807 and the antenna 808 (S1214). The data can be transmitted to the facsimile apparatus 602 using the SD field within 115.2/(32/8)=28.8 sec.

Upon reception of the radio wave via the antenna 712 and the wireless module 711, the CPU 701 of the facsimile apparatus 602 stores the data received in the SD field by the channel codec 710 in the memory 702, and transmits a message "data reception completion" to the digital camera in the LCCH field (S1215).

The CPU 701 of the facsimile apparatus 602 expands the data stored in the memory 702 using the image expanding unit 704 (S1216), converts the expanded data into CMYK data using the RGB/CMYK converting unit 705, transfers the CMYK data to the FAX encoding processing unit 405, and compresses the image again (S1217). The image compression is performed by the JPEG scheme. The data amount is compressed to about ⅛, which corresponds to about 115.2 kbytes. The compressed image data is stored in the memory 702 again.

The CPU 701 of the facsimile apparatus 602 transmits a call setting message to the ISDN 601 to perform originating processing (S1218). If the partner terminal responds, and the CPU 701 of the facsimile apparatus 602 receives a response message from the ISDN 601 (S1219), the CPU 701 transmits a message "line connection completion" to the digital camera 603 (S1220).

The CPU 701 of the facsimile apparatus 602 adds a header in accordance with a protocol to the compressed image data stored in the memory 702, and transfers the image data to the HDLC controller 709, which adds an HDLC header to the image data. The obtained data is assembled into an ISDN frame by the ISDN interface 708, and transmitted at a channel B1 (S1221).

Since the data amount upon compression is about 115.2 kbytes, the data can be transmitted within about 14.4 sec at a transmission rate of 64 kbps.

As described above, data is transmitted via a high speed wireless channel when high-resolution printing is performed without causing any deterioration by compression/expansion processing, and data is transmitted using a low speed wireless channel when the data is compressed and transmitted to a communication line. Accordingly, radio resources can be effectively utilized.

In the first embodiment, image data is not compressed when the image data is transmitted from the digital camera to the facsimile apparatus.

Even if the image data is compressed and transmitted when the digital camera is connected to the facsimile via the USB, the same effect can be obtained. That is, image data may be transmitted without being compressed when the data is to be printed, and compressed and transmitted when the data is to be transmitted to a communication line.

Accordingly, the transmission time is 0.74 sec in printing the data, as in the first embodiment, and is about 0.09 sec in transmitting the data to the communication line, which is ⅛ that in printing the data. The transmission line can be effectively used. Data can be effectively transmitted particularly when many terminals are connected to the USB.

The second embodiment uses a wireless channel made up of a high speed data channel and a low speed data channel with a spread spectrum communication scheme using a 2.4-GHz band. The same effect can also be obtained in the use of a wireless channel made up of a plurality of low speed data channels as in a PHS (Personal Handy-phone System).

Figure 10:
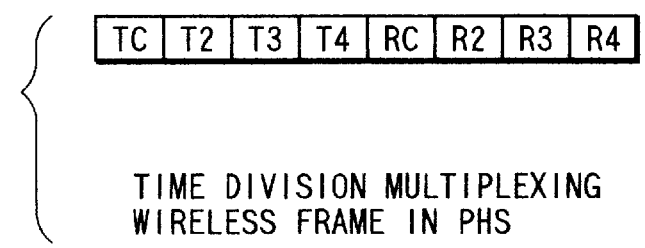
FIG. 10 is a view of the wireless frame format in a wireless image communication system using a PHS.

FIG. 10 shows the frame format of the PHS. The PHS frame has eight 32-kbps slots (four for one way). Of these slots, one is used to transmit control data.

In this case, when image data of the digital camera is printed by the facsimile apparatus, the image data is compressed at a first compression ratio (about ½), and transmitted using two 32-kbps slots. The data is transmitted within about 57.6 sec. The first compression method is reversible compression, unlike JPEG used in the second embodiment, and can reproduce the same image data as that expanded on the reception facsimile side.

When image data of the digital camera is to be transmitted to a communication channel via the facsimile, the image data is compressed at a second compression ratio (about ⅛), and transmitted using one 32-kbps slot. The data is transmitted within about 28.8 sec.

Prior to transmitting the image data, the digital camera and the facsimile apparatus exchange messages to determine a slot to be used, as in the first and second embodiments.

In this manner, when data compressed at a high compression ratio can be transmitted, the number of wireless slots used can be decreased to effectively utilize the wireless communication channel.

Third Embodiment

In the first embodiment, although data is transmitted using the USB, the feature of the USB that isochronous transfer enabling real-time transfer, and bulk transfer enabling transfer of a large amount of data can be simultaneously performed is not utilized.

By utilizing the feature of the USB, a greater merit can be attained.

Figure 13:
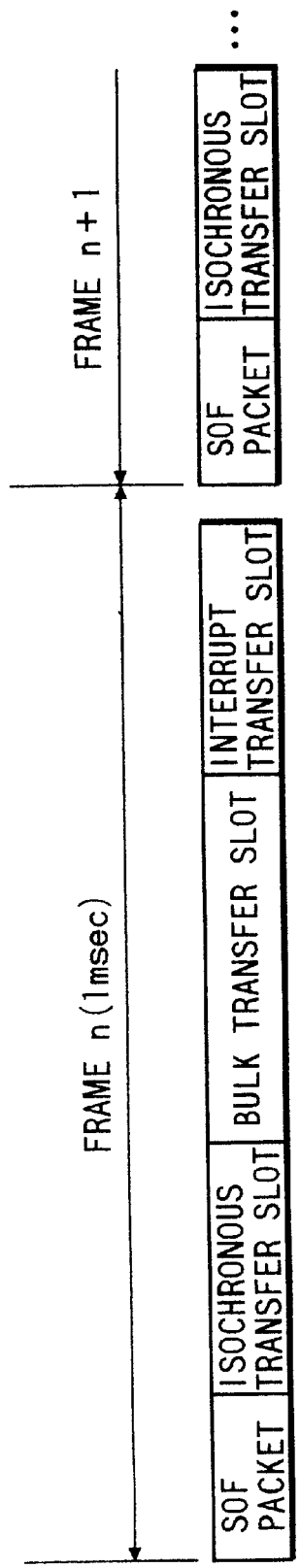
FIG. 13 is a conceptual view of the frame configuration of a USB in the image communication system according to the first, third, and fourth embodiments.

FIG. 13 is a conceptual view of the frame configuration of the USB. In FIG. 13, the USB frame is made up of a header (SOF: Start Of Frame) at the start of the frame, an isochronous transfer slot in which the transfer time is ensured every predetermined period in advance, and a voice or the like is transferred in real time by periodically transferring data every ensured time, an interrupt transfer slot in which a small amount of data is transferred within a predetermined delay time, and a bulk transfer slot in which a large amount of data such as printer data is transferred by transferring data in the remaining time after performing isochronous transfer and interrupt transfer.

The following description is associated with an example of performing bulk transfer using the bulk transfer slot when image data of a digital camera is to be color-printed by a facsimile (i.e., when a large amount of data is to be transmitted from the digital camera to the facsimile), and performing isochronous transfer using the isochronous transfer slot when image data of the digital camera is to be transmitted to the ISDN via the facsimile in real time.

The system construction in the third embodiment is the same as in the first embodiment (FIG. 3), and a description thereof will be omitted.

The construction of a facsimile apparatus 302 is also the same as in the first embodiment (FIG. 4), a description thereof will be omitted.

Figure 14:
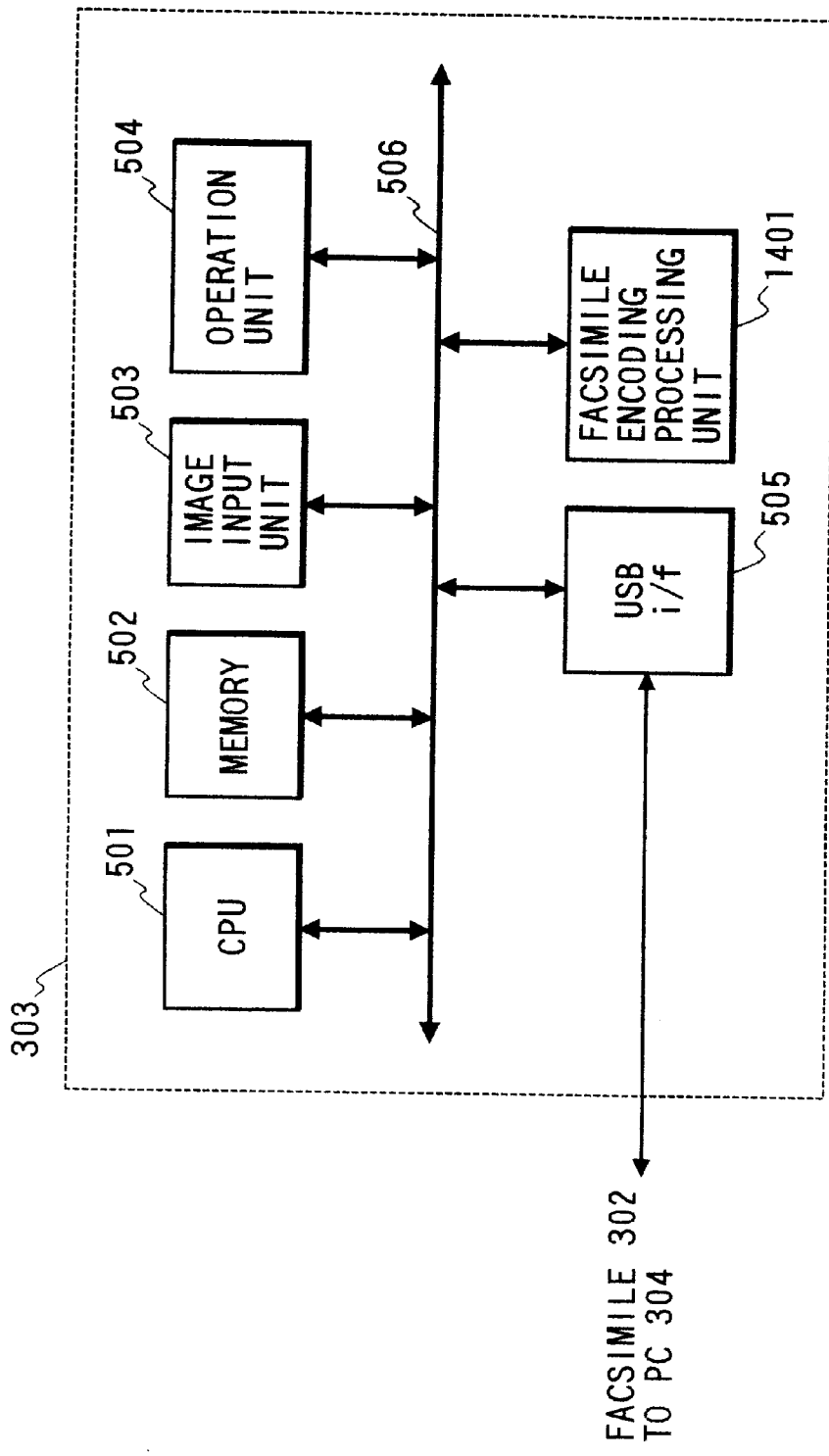
FIG. 14 is a block diagram of the construction of a digital camera in an image communication system according to the third embodiment.

The digital camera in the third embodiment has a construction shown in FIG. 14.

In FIG. 14, a facsimile encoding processing unit 1401 for facsimile-encoding image data input from an image input unit 503 it added to the construction of the digital camera in the first embodiment. The remaining construction is the same as in the first embodiment (FIG. 5), and a description thereof will be omitted.

Processing when image data photographed by a digital camera 303 is to be bulk-transferred to be color-printed by the facsimile apparatus 302, and processing when the image data is to be isochronously transferred to the facsimile apparatus 302, and transmitted to an ISDN 301 via the facsimile apparatus 302 in real time will be explained below with reference to FIG. 15.

Figure 15:
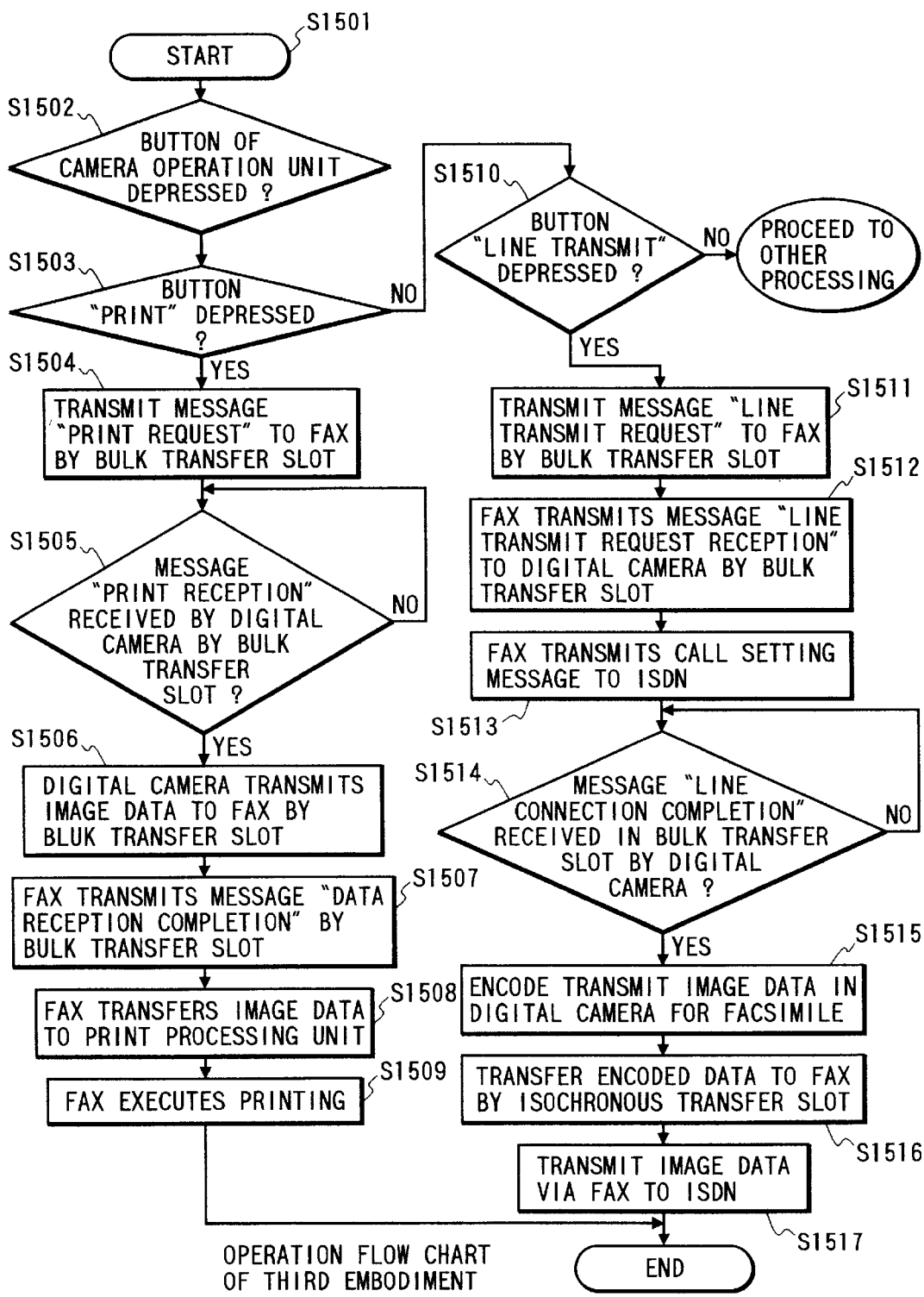
FIG. 15 is a flow chart of the operation of the image communication system according to the third embodiment.

In FIG. 15, image data of the digital camera 303 is to be color-printed, a CPU 501 of the digital camera 303 detects that a button of an operation unit 504 is depressed (S1502), and that the button is a button of "print" (S1503), the digital camera 303 transmits a message "print request" to the facsimile apparatus 302 via a USB interface 505 of the digital camera 303 and a USB interface 409 of the facsimile apparatus 302 (S1504). Since this message is not demanded for real-time communication, it is transmitted in the bulk transfer slot.

Upon receiving the message "print request" transmitted using the bulk transfer slot, a CPU 401 of the facsimile apparatus 302 transmits a message "print reception" to the digital camera 303 using the bulk transfer slot if the facsimile apparatus 302 is in a printable state. If the facsimile apparatus 302 cannot print data due to the absence of paper sheets or the like, the CPU 401 transmits a message "print disable" to the digital camera 303 using the bulk transfer slot to inform the digital camera 303 of a printer function error.

Upon reception of the message "print reception" transmitted using the bulk transfer slot (S1505), the CPU 501 of the digital camera 303 starts transmitting image data (S1506). Since this image data is not demanded for real-time communication either, and has a large data amount, it is transmitted in the bulk transfer slot. The digital camera 303 has image data at a resolution of 640 pixels×480 pixels. When image data is printed using three colors, i.e., R, G, and B, the data amount is 640×480×3=921.6 kbytes (KB). Considering the effective transmission rate of the USB =about 10 Mbps, the transmission time is 921.6/(10,000/8)=0.74 sec.

Upon reception of this image data, the CPU 401 of the facsimile apparatus 302 stores the received data in a memory 402, and transmits a message "data reception completion" to the digital camera using the bulk transfer slot (S1507).

The CPU 401 of the facsimile apparatus 302 transfers the image data stored in the memory 402 to a print processing unit 403, and causes the print processing unit 403 to control the printer head, printing the image data (S1508). Upon completion of the printing, the CPU 401 transmits a message "print completion" to the digital camera 303 using the bulk transfer slot to end the printing (S1509).

When image data of the digital camera 303 is transmitted to a remote partner connected via the ISDN, if the CPU 501 of the digital camera 303 detects that a button of "line transmit" of the digital camera 303 is depressed (S1510), the CPU 501 transmits a message "line transmit request" to the facsimile apparatus 302 using the bulk transfer slot (S1511). Upon reception of the message "line transmit request" transmitted using the bulk transfer slot, the CPU 401 of the facsimile apparatus 302 transmits a message "line transmit request reception" to the digital camera 303 using the bulk transfer slot (S1512).

The CPU 401 of the facsimile apparatus 302 transmits a call setting message to the ISDN 301 to perform originating processing (S1513). If the partner terminal responds, and the CPU 401 of the facsimile apparatus 302 receives a response message from the ISDN 301, the CPU 401 of the facsimile apparatus 302 transmits a message "line connection completion" to the digital camera 303 using the bulk transfer slot (S1514).

Upon reception of the message "line connection completion" transmitted using the bulk transfer slot, the CPU 501 of the digital camera 303 starts transmitting image data to the facsimile apparatus 302. The CPU 501 of the digital camera facsimile-encodes the image data by using the facsimile encoding processing unit 1401 of the digital camera 303 (S1515), and transmits the encoded data to the facsimile apparatus 302 using the isochronous transfer slot (S1516). The CPU 401 of the facsimile apparatus 302 transmits the data transmitted using the isochronous transfer slot to the partner terminal via the ISDN 301 (S1517). The encoded data is transmitted at a transmission rate of 64 kbps at most, and must be transmitted in real time in accordance with a facsimile protocol. Therefore, the encoded image data is transmitted by the isochronous transfer slot.

By changing the operation of the digital camera in the above manner, data can be printed out and transmitted to a communication line via the facsimile apparatus without transferring the data to a personal computer or connecting the digital camera to a dedicated apparatus. If the isochronous transfer of the USB is used particularly in transmitting data to the communication line, other data can be transmitted in the bulk transfer slot while image data is transmitted to the communication line, thereby effectively using the communication line.

If the bulk and isochronous transfer slots of the USB are selectively used depending on how to output data transmitted from the image input apparatus, the communication line can be effectively utilized, and the data can be transmitted for an application purpose.

Fourth Embodiment

Figure 16:
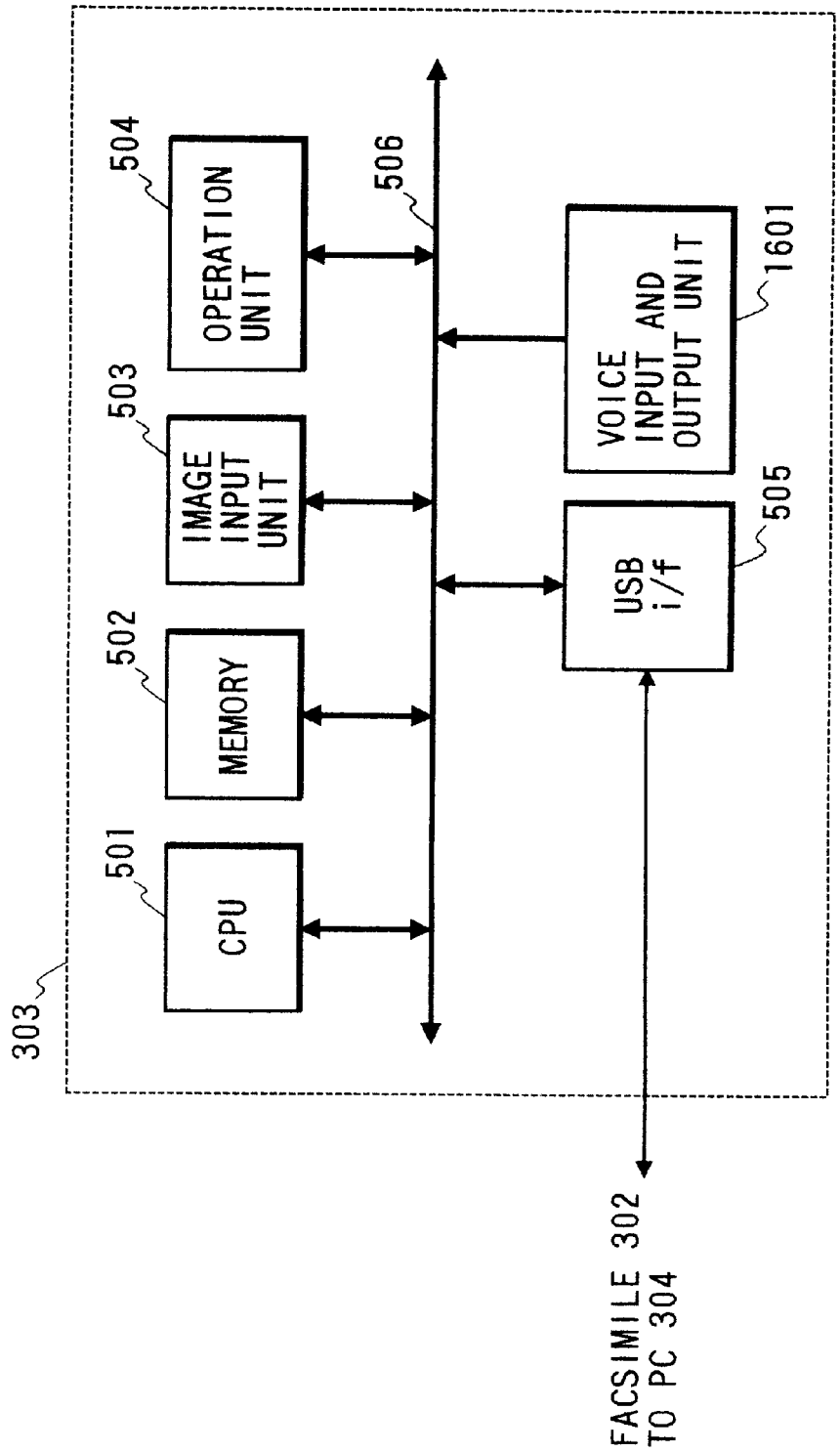
FIG. 16 is a block diagram of the construction of a digital camera in an image communication system according to the fourth embodiment.

In the first to third embodiments, the digital camera processes only image data. In the fourth embodiment, the digital camera comprises a voice input and output unit 1601 constituted by a handset or the like for inputting and outputting voices generally demanded for real-time communication, as shown in FIG. 16.

The remaining construction of the digital camera, the system construction, and the construction of the facsimile apparatus are the same as in the first embodiment (FIGS. 3 and 4), and a description thereof will be omitted.

In the fourth embodiment, the case wherein a voice from a digital camera 303 is communicated in real time via a facsimile apparatus 302 and an ISDN 301 will be described with reference to FIG. 17.

Figure 17:
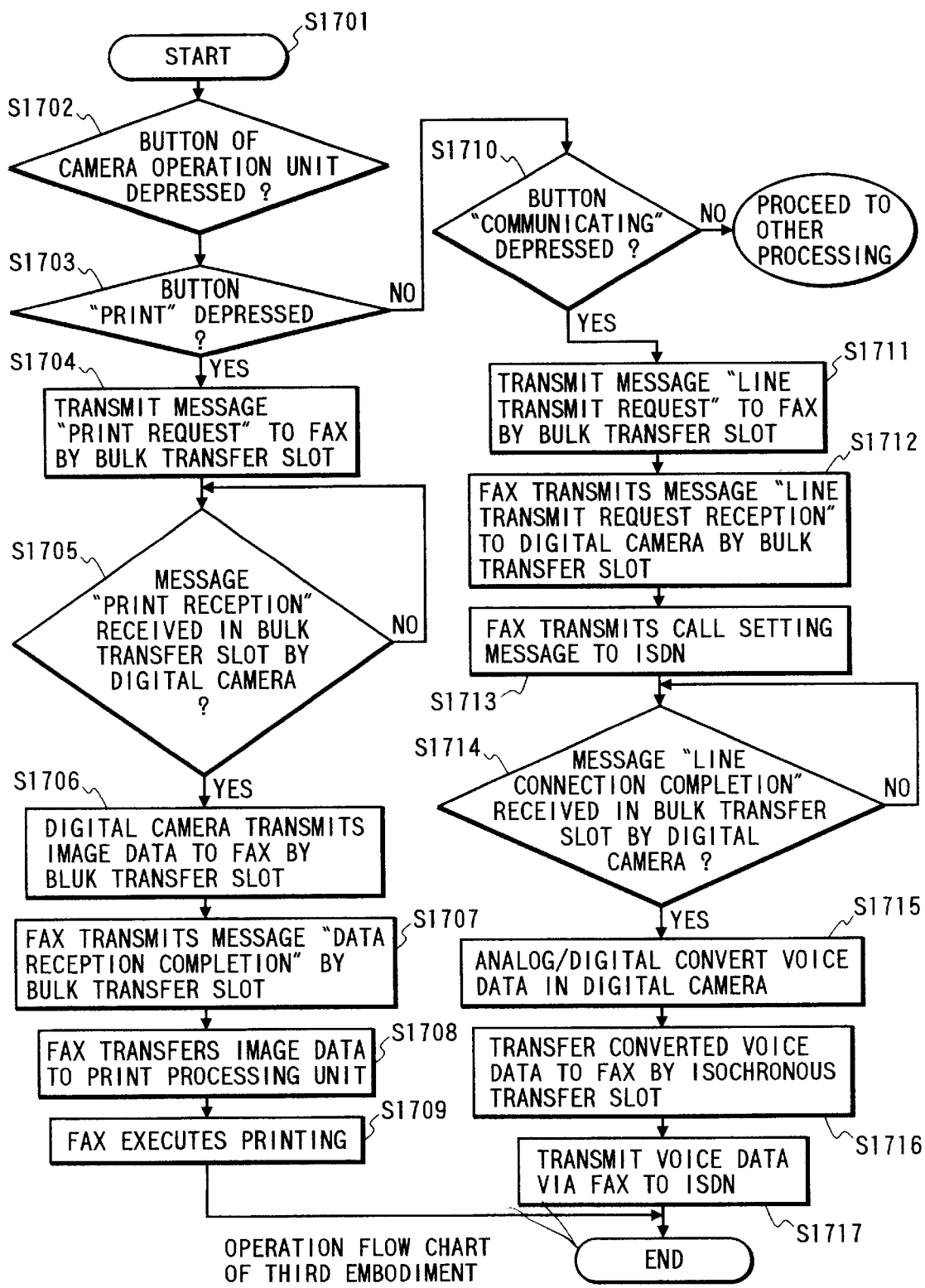
FIG. 17 is a flow chart of the operation of the image communication system according to the fourth embodiment.

In FIG. 17, when image data of the digital camera 303 is to be printed by the facsimile apparatus 302, the image data is transmitted from the digital camera 303 to the facsimile apparatus 302 using the bulk transfer slot of the USB (S1701 to S1709), similar to the third embodiment.

When a telephone call must be made via the ISDN while transmitting the image data, if a CPU 501 of the digital camera 303 detects that a button "communicating" of an operation unit 504 is depressed (S1710), the CPU 501 transmits a message "line transmit request" to the facsimile apparatus 302 using the bulk transfer slot (S1711). Upon reception of the message "line transmit request" transmitted using the bulk transfer slot, a CPU 401 of the facsimile apparatus 302 transmits a message "line transmit request reception" to the digital camera 303 using the bulk transfer slot (S1712).

The CPU 401 of the facsimile apparatus 302 transmits a call setting message to the ISDN 301 to perform originating processing (S1713). If a partner terminal responds, and the CPU 401 of the facsimile apparatus 302 receives a response message from the ISDN 301, the CPU 401 of the facsimile apparatus 302 transmits a message "line connection completion" to the digital camera 303 using the bulk transfer slot (S1714).

Upon reception of the message "line connection completion" transmitted by the bulk transfer slot, the CPU 501 of the digital camera 303 starts transmitting voice data to the facsimile apparatus 302 using the isochronous transfer slot. This voice is input from a microphone attached to the voice input and output unit 1601 of the digital camera 303, analog/digital-converted (S1715), transmitted as data having a transmission rate of 64 kbps to the facsimile apparatus 302 in the isochronous transfer slot (S1716), and transmitted to the partner terminal via the facsimile apparatus 302 and the ISDN 301 (S1717). Voice data must be transmitted in real time. Therefore, this voice data is transmitted in the isochronous transfer slot.

As described above, when the bulk transfer of the USB is used in transmitting and printing a large amount of image data not demanded for real-time communication, and the isochronous transfer of the USB is used in transmitting voice data demanded for real-time communication, the communication line can be efficiently utilized to simultaneously transmit an image and a voice.

The fourth embodiment has exemplified the case wherein voice data demanded for real-time communication is communicated by the isochronous transfer slot while image data is communicated by the bulk transfer slot. However, communication of image data using the bulk transfer slot, and communication of voice data using the isochronous transfer slot may not be performed simultaneously.

The first to fourth embodiments assume the USB as a connection line for connecting the digital camera to the facsimile apparatus. However, the same effect can be obtained by another connection line such as IEEE 1394 as long as the connection line can simultaneously perform high speed data transfer and real-time data transfer.

The first to fourth embodiments assume the facsimile as a network control apparatus. However, the same processing can be performed by an apparatus other than the facsimile apparatus as far as the apparatus has a communication line connecting function and a print function.

Although the first to third embodiments assume the ISDN as a communication line, the same processing can be performed even with an analog public line.

As has been described above, according to the present invention, image data of an image input apparatus such as a digital camera can be printed and transmitted to a communication line by a simple operation.

When an image input apparatus such as a digital camera, a visual output apparatus such as a printer, and a communication apparatus are connected via a wireless channel, the wireless channel can be efficiently used.

The bulk transfer-slot of the USB is used when image data of the image input apparatus such as a digital camera is to be printed, and the isochronous transfer slot of the USB is used when image data or voice data is to be transmitted to the communication line in real time. Accordingly, various media can be transmitted while the connection line which connects the image input apparatus and the communication apparatus is efficiently used.

More specifically, by changing the transfer method between, e.g., the bulk transfer and isochronous transfer of the USB depending on how to output data to be transferred, the connection line which connects the image input apparatus and the communication apparatus can be effectively utilized.

In addition, data can be transferred various application purposes by connecting the image input apparatus and the communication apparatus using a connection line which can adopt a plurality of transfer methods such as a transfer method suitable for transfer of non-real-time data, and a transfer method suitable for transfer of real-time data.

What is claimed is:

1. An image communication system comprising a communication apparatus having communication means for performing communication via a communication line, and visual output means for visually outputting an image, and an image input apparatus for inputting an image, wherein said image input apparatus comprises:

instructing means for instructing said communication apparatus either to transmit by said communication means in said communication apparatus via the communication line an image data transmitted from said image input apparatus, or to visually output by said visual output means in said communication apparatus the image data transmitted from said image input apparatus; and transmitting means for transmitting to said communication apparatus, the image data which causes said communication apparatus to perform processes in accordance with said instructing means; and said communication apparatus comprises:

receiving means for receiving the image data transmitted from said image input apparatus; and control means for performing control either to transmit the received image data by said communication means via said communication line, or to visually output the received image data by said visual output means, in accordance with the instructions by said instructing means.

2. A system according to claim 1, wherein said communication apparatus comprises converting means for converting the image data received by said receiving means, in accordance with the instructions by said instructing means.

3. A system according to claim 1, wherein said image input apparatus comprises compressing means for compressing the image data, and said transmitting means transmits the image data to said communication apparatus without compressing the image data when the image data is visually output, and compresses the image data using said compressing means to transmit the compressed data to said communication apparatus when the image data is transmitted via said communication line.

4. A system according to claim 1, wherein said transmitting means and said receiving means perform communication using a wireless communication line.

5. A system according to claim 4, wherein the image data is transmitted to said communication apparatus using wireless communication lines having different capacities depending on a case in which the image data is visually output and a case in which the image data is transmitted via said communication line.

6. A system according to claim 1, wherein said image input apparatus comprises compressing means for compressing the image data at different compression ratios depending on a case in which the image data is visually output and a case in which the image data is transmitted via said communication line.

7. A system according to claim 4, wherein, said transmitting means transmits the image data using a different number of wireless communication lines depending on a case in which the image data is to be visually output and a case in which the image data is to be transmitted via said communication line.

8. A system according to claim 4, wherein said wireless communication line has a time division multiplexing wireless communication line constituted by a plurality of wireless slots, and said receiving means receives the image data using a different number of wireless slots in accordance with the instructions by said instructing means.

9. A system according to claim 1, wherein said visual output means visually outputs the image data by printing out the image data.

10. A system according to claim 1, wherein said image input apparatus is a digital camera.

11. A system according to claim 1, wherein said communication apparatus is a facsimile apparatus.

12. A system according to claim 1, wherein said image input apparatus and said communication apparatus are connected using a USB (Universal Serial Bus).

13. A systems to claim 12, wherein said transmitting means transmits the image data using different types of transfer slots of said USB in accordance with the instructions for said communication apparatus to transmit the image data to the communication line or to visually output the image data.

14. A system according to claim 13, wherein the different types of transfer slots are at least two of a bulk transfer slot, an isochronous transfer slot, and an interrupt transfer slot of said USB.

15. A system according to claim 12, wherein said image input apparatus comprises facsimile encoding processing means for facsimile-encoding the image data when the image data is to be transmitted via said communication line, and said transmitting means transmits the image data encoded by said facsimile encoding processing means using an isochronous transfer slot of said USB, and transmits image data not encoded by said facsimile encoding processing means using a bulk transfer slot of said USB.

16. A system according to claim 12, wherein said image input apparatus comprises voice communication means for communicating a voice, the voice communicated by said voice communication means is communicated using an isochronous transfer slot of said USB, and the image data transmitted by said transmitting means is transmitted using a bulk transfer slot of said USB.

17. A method of controlling an image communication system comprising a communication apparatus having a communication function of performing communication via a communication line, and a visual output function of visually outputting an image, and an image input apparatus for inputting an image, wherein said image input apparatus performs the steps of:

an instructing step of instructing said communication apparatus either to transmit by said communication function comprised in said communication apparatus via the communication line an image data transmitted from said image input apparatus, or to visually output by said visual output function comprised in said communication apparatus the image data transmitted from said image input apparatus; and a transmitting step of transmitting to said communication apparatus, the image data which causes said communication apparatus to perform processes in accordance with said instructing means; and said communication apparatus performs the steps of:

a receiving step of receiving the image data transmitted from said image input apparatus; and a control step of performing control either to transmit said received image data by said communication function via the communication line, or to visually output said received image data by said visual output function, in accordance with the instructions in said instructing step.

18. A method according to claim 17, wherein said communication apparatus performs the converting step of converting the image data received in the receiving step, in accordance with the instructions in the instructing step.

19. A method according to claim 17, wherein said image input apparatus performs a compressing step of compressing the image data, and the transmitting step comprises transmitting the image data to said communication apparatus without compressing the image data when the image data is visually output, and compressing the image data in the compressing step to transmit the compressed data to said communication apparatus when the image data is transmitted via s aid communication line.

20. A method according to claim 17, wherein communication in the transmitting step and the receiving step is performed using a wireless communication line.

21. A method according to claim 20, wherein the transmitting step comprises transmitting the image data to said communication apparatus using wireless communication lines having different capacities depending on a case in which the image data is visually output and a case in which the image data is transmitted via said communication line.

22. A method according to claim 17, wherein said image input apparatus comprises the compressing step of compressing the image data at different compression ratios depending on a case in which the image data is visually output and a case in which the image data is transmitted via said communication line.

23. A method according to claim 20, wherein, the transmitting step comprises transmitting the image data using a different number of wireless communication channels depending on a case in which the image data is to be visually output and a case in which the image data is to be transmitted via said communication line.

24. A method according to claim 20, wherein said wireless communication channel has a time division multiplexing wireless communication line constituted by a plurality of wireless slots and the receiving step comprises receiving the image data using a different number of wireless slots in accordance with the instructions in the instructing step.

25. A method according to claim 17, wherein said visual output function visually outputs the image data by printing out the image data.

26. A method according to claim 17, wherein said image input apparatus is a digital camera.

27. A method according to claim 17, wherein said communication apparatus is a facsimile apparatus.

28. A method according to claim 17, wherein said image input apparatus and said communication apparatus are connected using a USB (Universal Serial Bus).

29. A method according to claim 28, wherein the transmitting step comprises transmitting the image data using different types of transfer slots of said USB in accordance with the instructions for said communication apparatus to transmit the image data via the communication line or to visually output the image data.

30. A method according to claim 29, wherein the different types of transfer slots are at least two of a bulk transfer slot, an isochronous transfer slot, and an interrupt transfer slot of said USB.

31. A method according to claim 28, wherein the method of controlling said image input apparatus comprises the facsimile encoding processing step of facsimile-encoding the image data when the image data is to be transmitted via said communication line, and the transmitting step comprises transmitting the image data encoded in the facsimile encoding processing step using an isochronous transfer slot of said USB, and transmitting image data not encoded in the facsimile encoding processing step using a bulk transfer slot of said USB.

32. A method according to claim 28, wherein the method of controlling said image input apparatus comprises the voice communication step of communicating a voice, the voice communicated in the voice communication step is communicated using an isochronous transfer slot of said USB, and the image data transmitted In the transmitting step is transmitted using a bulk transfer slot of said USB.

33. An image input apparatus connectable to a communication apparatus having communication means for performing communication via a communication line, and visual output means for visually outputting an image, comprising:

instruction means for instructing said communication apparatus either to transmit by said communication means in said communication apparatus via the communication line an image data transmitted from the image input apparatus, or to visually output by said visual output means in said communication apparatus the image data transmitted from the image input apparatus; and transmitting means for transmitting to, said communication apparatus, the image data which causes said communication apparatus to perform processes in accordance with the instructions by said instructing means.

34. An apparatus according to claim 33, wherein said image input apparatus comprises compressing means for compressing the image data, and said transmitting means transmits the image data to said communication apparatus without compressing the image data when the image data is visually output, and compresses the image data using said compressing means to transmit the compressed data to said communication apparatus when the image data is transmitted via said communication line.

35. An apparatus according to claim 33, wherein said transmitting means performs communication using a wireless communication line.

36. An apparatus according to claim 35, wherein said transmitting means transmits the image data to said communication apparatus using wireless communication lines having different capacities depending on a case in which the image data is visually output and a case in which the image data is transmitted via said communication line.

37. An apparatus according to claim 33, wherein said image input apparatus comprises compressing means for compressing the image data at different compression ratios depending on a case in which the image data is visually output and a case in which the image data is transmitted via said communication line.

38. An apparatus according to claim 35, wherein, said transmitting means transmits the image data using a different number of wireless communication lines depending on a case in which the image data is to be visually output and a case in which the image data is to be transmitted via said communication line.

39. An apparatus according to claim 35, wherein said wireless communication channel has a time division multiplexing wireless communication line constituted by a plurality of wireless slots, and said transmitting means transmits the image data using a different number of wireless slots in accordance with the instructions by said instructing means.

40. An apparatus according to claim 33, wherein said image input apparatus is a digital camera.

41. An apparatus according to claim 33, wherein said image input apparatus and said communication apparatus are connected using a USB (Universal Serial Bus).

42. An apparatus according to claim 41, wherein said transmitting means transmits the image data using different types of transfer slots of said USB in accordance with the instructions for said communication apparatus to transmit the image data to the communication line or to visually output the image data.

43. An apparatus according to claim 42, wherein the different types of transfer slots are at least two of a bulk transfer slot, an isochronous transfer slot, and an interrupt transfer slot of said USB.

44. An apparatus according to claim 41, wherein said Image input apparatus comprises facsimile encoding processing means for facsimile-encoding the image date when the image data is to be transmitted via said communication line, and said transmitting means transmits the image data encoded by said facsimile encoding processing means using an isochronous transfer slot of said USB, and transmits image data not encoded by said facsimile encoding processing means using a bulk transfer slot of said USB.

45. An apparatus according to claim 41, wherein said image input apparatus comprises voice communication means for communicating a voice, the voice communicated by said voice communication means is communicated using an isochronous transfer slot of said USB, and the image data transmitted by using different types of transfer slots of said USB depending on whether the image data is visually output or transmitted via said communication line.

46. A communication apparatus connectable to an image input apparatus and having communication means for performing communication via a communication line, and visual output means for visually outputting an image, comprising:

receiving means for receiving from said image input apparatus an instructions information for instructing to transmit by said communication means via said communication line an image data transmitted from said image input apparatus and an instructions information for instructing to visually output by said visual output means the visual image data transmitted from said image input apparatus, and for receiving the image data transmitted from said image input apparatus; and control means for performing control either to transmit by said communication means via the communication line the image data received from said image input apparatus, or to visually output by said visual output means the image data received from said image input apparatus, in accordance with the instructions information received by said receiving means.

47. An apparatus according to claim 46, wherein said communication apparatus comprises converting means for converting the image data received by said receiving means, in accordance with the instructions information received by said receiving means.

48. An apparatus according to claim 46, wherein said receiving means performs communication using a wireless communication line.

49. An apparatus according to claim 48, wherein said receiving means receives the image data using wireless communication lines having different capacities depending on a case in which the image data is visually output and a case in which the image data is transmitted via said communication line. said transmitting means is transmitted using a bulk transfer slot of said USB.

50. An apparatus according to claim 46, wherein said receiving means receives the image data at different compression ratios depending on a case in which the image data is visually output and a case in which the image data is transmitted via said communication line.

51. An apparatus according to claim 48, wherein, said receiving means receives the image data using a different number of wireless communication lines depending on a case in which the image data is to be visually output and a case in which the image data is to be transmitted via said communication line.

52. An apparatus according to claim 48, wherein said wireless communication channel has a time division multiplexing wireless communication channel constituted by a plurality of wireless slots, and said receiving means receives the image data using a different number of wireless slots in accordance with the instructions information received by said receiving means.

53. An apparatus according to claim 46, wherein said visual output means visually outputs the image data by printing out the image data.

54. An apparatus according to claim 46, wherein said communication apparatus is a facsimile apparatus.

55. An apparatus according to claim 46, wherein said image input apparatus and said communication apparatus are connected using a USB (Universal Serial Bus).

56. An apparatus according to claim 55, wherein said receiving means receives the image data said receiving means, or to output the image data by said visual output means, in accordance with the instruction by said instructing means.

57. An apparatus according to claim 56, wherein the different types of transfer slots are at least two of a bulk transfer slot, an isochronous transfer slot, and an interrupt transfer slot of said USB.

58. An apparatus according to claim 55, wherein said receiving means receives the image data using an isochronous transfer slot of said USB when image data facsimile-encoded by said image input apparatus is to be received, and receives the image data using a bulk transfer slot of said USB when image data not encoded for a facsimile is to be received.

59. An apparatus according to claim 55, wherein said communication apparatus comprises voice communication means for communicating a voice communicated by said image input apparatus, the voice communicated by said voice communication means is communicated using an isochronous transfer slot of said USB, and the image data received by said receiving means is transmitted using a bulk transfer slot of said USB.

60. A method of controlling an image input apparatus connectable to a communication apparatus having a communication function of performing communication via a communication line, and a visual output function of visually outputting an image, comprising:

an instructing step of instructing said communication apparatus either to transmit by said communication function comprised in said communication apparatus via said communication line an image data transmitted from said image input apparatus, or to visually output by said visual output function comprised in said communication apparatus the image data transmitted from said image input apparatus; and a transmitting step of transmitting to said communication apparatus, the image data which causes said communication apparatus to perform a process in accordance with the instructions by said instructing step.

61. A method according to claim 60, wherein the method of controlling said image input apparatus comprises the compressing step of compressing the image data, and the transmitting step comprises transmitting the image data to said communication apparatus without compressing the image data when the image data is visually output, and compressing the image data in the compressing step to transmit the compressed data to said communication apparatus when the image data is transmitted via said communication line.

62. A method according to claim 60, wherein the transmitting steps comprise performing communication using a wireless communication line.

63. A method according to claim 62, wherein the transmitting step comprises transmitting the image data to said communication apparatus using wireless communication lines having different capacities depending on a case in which the image data is visually output and a case in which the image data is transmitted via said communication line.

64. A method according to claim 60, wherein the method of controlling said image input apparatus comprises the compressing step of compressing the image data at different compression ratios depending on a case in which the image data is visually output and a case in which the image data is transmitted via said communication line.

65. A method according to claim 62, wherein, the transmitting step comprises transmitting the image data using a different number of wireless communication lines depending on a case in which the image data is to be visually output and a case in which the image data is to be transmitted via said communication line.

66. A method according to claim 62, wherein said wireless communication channel has a time division multiplexing wireless communication channel constituted by a plurality of wireless slots, and the transmitting step comprises transmitting the image data using a different number of wireless slots in accordance with the instructions in the instructing step.

67. A method according to claim 60, wherein said image input apparatus is a digital camera.

68. A method according to claim 60, wherein said image input apparatus and said communication apparatus are connected using a USB (Universal Serial Bus).

69. A method according to claim 68, wherein the transmitting step comprises transmitting the image data using different types of transfer slots of said USB in accordance with the instruction for said communication apparatus to transmit the image data to the communication line or to visually output the image data.

70. A method according to claim 69, wherein the different types of transfer slots are at least two of a bulk transfer slot, an isochronous transfer slot, and an interrupt transfer slot of said USB.

71. A method according to claim 68, wherein the method of controlling said image input apparatus comprises the facsimile encoding processing step of facsimile-encoding the image data when the image data is to be transmitted via said communication line, and the transmitting step comprises transmitting the image date encoded in the facsimile encoding processing step using an isochronous transfer slot of said USB, and transmitting image data not encoded in the facsimile encoding processing step using a bulk transfer slot of said USB.

72. A method according to claim 68, wherein the method of controlling said image input apparatus comprises the voice communication step of communicating a voice, the voice communicated in the voice communication step is communicated using an isochronous transfer slot of said USB, and the image data transmitted in the transmitting step is transmitted using a bulk transfer slot of said USB.

73. A method of controlling a communication apparatus connectable to an image input apparatus and having communication means for performing communication via a communication line and output means for visually outputting an image, comprising:

a receiving step of receiving an instructions information for instructing to transmit by said communication means via said communication line an image data transmitted from said image input apparatus and an instructions information for instructing to visually output by said visual output means the image data transmitted from said image input apparatus, and of receiving the image data transmitted from said image input apparatus; and a control step of performing control either to transmit by said communication means via the communication line the image data received from said image input apparatus, or to visually output by said visual output means the image data receiving said image input apparatus, in accordance with the instructions information received in said receiving step.

74. A method according to claim 73, wherein the method of controlling said communication apparatus comprises a converting step of converting the image data received in the receiving step, in accordance with the instructions information received in said receiving step.

75. A method according to claim 73, wherein the receiving steps comprise performing communication using a wireless communication line.

76. A method according to claim 75, wherein the receiving step comprises receiving the image data using wireless communication lines having different capacities depending on a case in which the image data is visually output and a case in which the image data is transmitted via said communication line.

77. A method according to claim 73, wherein the receiving step comprises receiving the image data at different compression ratios depending on a case in which the image data is visually output and a case in which the image data is transmitted via said communication line.

78. A method according to claim 75, wherein, the receiving step comprises receiving the image data using a different number of wireless communication channels depending on a case in which the image data is to be visually output and a case in which the image data is to be transmitted via said communication line.

79. A method according to claim 75, wherein said wireless communication channel has a time division multiplexing wireless communication channel constituted by a plurality of wireless slots, and the receiving step comprises receiving the image data using a different number of wireless slots in accordance with the instructions information received in said receiving step.

80. A method according to claim 73, wherein the visual output means comprises visually outputting the image data by printing out the image data.

81. A method according to claim 73, wherein said communication apparatus is a facsimile apparatus.

82. A method according to claim 73, wherein said image input apparatus and said communication apparatus are connected using a USB (Universal Serial Bus).

83. A method according to claim 82, wherein the receiving step comprises receiving the image data using different types of transfer slots of said USB in accordance with whether the image data is visually output or transmitted via said communication line.

84. A method according to claim 83, wherein the different types of transfer slots are at least two of a bulk transfer slot, an isochronous transfer slot, and an interrupt transfer slot of said USB.

85. A method according to claim 82, wherein the receiving step comprises receiving the image data using an isochronous transfer slot of said USB when image data facsimile-encoded by said image input apparatus is to be received, and receiving the image data using a bulk transfer slot of said USB when image data not encoded for a facsimile is to be received.

86. A method according to claim 82, wherein the method of controlling said communication apparatus comprises a voice communication step of communicating a voice communicated by said image input apparatus, the voice communicated in the voice communication step is communicated using an isochronous transfer slot of said USB, and the image data received in the receiving step is transmitted using a bulk transfer slot of said USB.

87. A program storage device readable by a machine, tangibly embodying a program of instructions executable by the machine to perform method steps for controlling an image input apparatus connectable to a communication apparatus having a communication function of performing communication via a communication line, and a visual output function of visually outputting an image, said method steps comprising:

an instructing step of instructing said communication apparatus either to transmit by said communication function comprised in said communication apparatus via the communication line an image data transmitted from said image input apparatus, or to visually output by said visual output function comprised in said communication apparatus the image data transmitted from said image input apparatus; and a transmitting step of transmitting to said communication apparatus, the image data which causes said communication apparatus to perform a process in accordance with the instructions by said instructing step.

88. A device according to claim 87, wherein the program comprises a compressing step of compressing the image data, and the transmitting step comprises transmitting the image data to said communication apparatus without compressing the image data when the image data is visually output, and compressing the image data in the compressing step to transmit the compressed data to said communication apparatus when the image data is transmitted via said communication line.

89. A device according to claim 87, wherein the transmitting steps comprise performing communication using a wireless communication line.

90. A device according to claim 89, wherein the transmitting step comprises transmitting the image data to said communication apparatus using wireless communication lines having different capacities depending on a case in which the image data is visually output and a case in which the image data is transmitted-via said communication line.

91. A device according to claim 87, wherein the program comprises a compressing step of compressing the image data at different compression ratios depending on a case in which the image data is visually output and a case in which the image data is transmitted via said communication line.

92. A device according to claim 89, wherein, the transmitting step comprises transmitting the image data using a different number of wireless communication lines depending on a case in which the image data is to be visually output and a case in which the image data is to be transmitted via said communication line.

93. A device according to claim 89, wherein said wireless communication channel has a time division multiplexing wireless communication channel constituted by a plurality of wireless slots, and the transmitting step comprises transmitting the image data using a different number of wireless slots in accordance with the instructions in the instructing step.

94. A device according to claim 87, wherein said image input apparatus is a digital camera.

95. A device according to claim 87, wherein said image input apparatus and said communication apparatus are connected using a USB (Universal Serial Bus).

96. A device according to claim 95, wherein the transmitting step comprises transmitting the image data using different types of transfer slots of said USB in accordance with the instructions in the instructing step.

97. A device according to claim 96, wherein the different types of transfer slots are at least two of a bulk transfer slot, an isochronous transfer slot, and an interrupt transfer slot of said USB.

98. A device according to claim 95, wherein the program comprises the facsimile encoding processing step of facsimile-encoding the image data when the image date is to be transmitted via said communication line, and the transmitting step comprises transmitting the image data encoded in the facsimile encoding processing step using an isochronous transfer slot of said USB, and transmitting image data not encoded in the facsimile encoding processing step using a bulk transfer slot of said USB.

99. A device according to claim 95, wherein the program comprises a voice communication step of communicating a voice, the voice communicated in the voice communication step is communicated using an isochronous transfer slot of said USB, and the image data transmitted in the transmitting step is transmitted using a bulk transfer slot of said USB.

100. A program storage device readable by a machine, tangibly embodying a program of instructions executable by the machine to perform method steps for controlling a communication apparatus connectable to an image input apparatus and having communication means for performing communication via a communication line and a visual output means for visually outputting an image, said method steps comprising:

a receiving step of receiving an instructions information for instructing to transmit by said communication means via said communication line an image data transmitted from said image input apparatus and an instructions information for instructing to visually output by said visual output means the image data transmitted from said image input apparatus, and of receiving the image data transmitted from said image input apparatus; and a control step of performing control either to transmit by said communication means via the communication line the image data received from said image input apparatus, or to visually output by said visual output means the image data receiving said image input apparatus, in accordance with the instructions information received in said receiving step.

101. A device according to claim 100, wherein the program comprises a converting step of converting the image data received in the receiving step, in accordance with the instructions information received in said receiving step.

102. A device according to claim 100, wherein the receiving step comprises performing communication using a wireless communication channel.

103. A device according to claim 102, wherein the receiving step comprises receiving the image data using wireless communication channels having different capacities depending on a case in which the image data is visually output and a case in which the image data is transmitted via said communication line.

104. A device according to claim 100, wherein the receiving step comprises receiving the image data at different compression ratios depending on a case in which the image data is visually output and a case in which the image data is transmitted via said communication line.

105. A device according to claim 102, wherein, the receiving step comprises receiving the image data using a different number of wireless communication lines depending on a case in which the image data is to be visually output and a case in which the image data is to be transmitted via said communication line.

106. A device according to claim 102, wherein said wireless communication channel has a time division multiplexing wireless communication channel constituted by a plurality of wireless slots, and the receiving step comprises receiving the image data using a different number of wireless slots in accordance with the instructions information received in said receiving step.

107. A device according to claim 100, wherein the visually output step comprises visually outputting the image data by printing out the image data.

108. A device according to claim 100, wherein said communication apparatus is a facsimile apparatus.

109. A device according to claim 100, wherein said image input apparatus and said communication apparatus are connected using a USB (Universal Serial Bus).

110. A device according to claim 109, wherein the receiving step comprises receiving the image data using different types of transfer slots of said USB in accordance with whether the image data is visually output or transmitted via said communication line.

111. A device according to claim 110, wherein the different types of transfer slots are at least two of a bulk transfer slot, an isochronous transfer slot, and an interrupt transfer slot of said USB.

112. A device according to claim 109, wherein the receiving step comprises receiving the image data using an isochronous transfer slot of said USB when image data facsimile-encoded by said image input apparatus is to be received, and receiving the image data using a bulk transfer slot of said USB when image data not encoded for a facsimile is to be received.

113. A device according to claim 109, wherein the method of controlling said communication apparatus comprises a voice communication step of communicating a voice communicated by said image input apparatus, the voice communicated in the voice communication step is communicated using an isochronous transfer slot of said USB, and the image data received in the receiving step is transmitted using a bulk transfer slot of said USB.

* * * * *

UNITED STATES PATENT AND TRADEMARK OFFICE
CERTIFICATE OF CORRECTION

PATENT NO. : 6,288,800 B1
DATED : September 11, 2001
INVENTOR(S) : Michihiro Izumi It is certified that error appears in the above-identified patent and that said Letters Patent is hereby corrected as shown below:

Column 3,
Line 53, "bus-410." should read -- bus 410. --.

Column 5,
Line 65, "ä" should read -- a --.

Column 9,
Line 29, "it" should read -- is --.

Column 12,
Line 20, "transfer-slot" should read -- transfer slot --; and
Line 35, "transferred" should read -- transferred for --.

Column 13,
Line 30, "wherein," should read -- wherein --; and
Line 53, "systems" should read -- system according --.

Column 14,
Line 56, "s aid" should read -- said --.

Column 15,
Line 4, "wherein," should read -- wherein --; and
Line 52, "In" should read -- in --.

Column 16,
Line 1, "to," should read -- to --;
Line 28, "wherein," should read -- wherein --;
Line 58, "Image" should read -- image --; and
Line 59, "date" should read -- data --.

Column 17,
Line 6, "by" should read -- by said transmitting means is transmitted using a bulk transfer slot of said USB. --;
Lines 7-9, should be deleted;
Lines 15, 17 and 18, "an" should read -- the --;
Line 44, "said transmitting means is transmitted using" should be deleted;
Line 45 should be deleted; and
Line 51, "wherein," should read -- wherein --.

UNITED STATES PATENT AND TRADEMARK OFFICE
CERTIFICATE OF CORRECTION

PATENT NO. : 6,288,800 B1
DATED : September 11, 2001
INVENTOR(S) : Michihiro Izumi It is certified that error appears in the above-identified patent and that said Letters Patent is hereby corrected as shown below:

Column 18,
Line 7, "data said receiving" should read -- data using different types of transfer slots of said USB depending on whether the image data is visually output or transmitted via said communication line. --;
Lines 8 and 9, should be deleted;
Line 10, "means." should be deleted; and
Line 37, "an" should read -- the --.

Column 19,
Line 4, "wherein," should read -- wherein --;
Lines 56, 59 and 60, "an" should read -- the --.

Column 20,
Line 23, "wherein," should read -- wherein --.

Column 21,
Line 14, "an" should read -- the --;
Line 42, "transmitted-via" should read -- transmitted via --; and
Line 48, "wherein," should read -- wherein --.

Column 22,
Line 8, "date" should read -- data --;
Lines 32, 34 and 35, "an" should read -- the --; and
Line 66, "wherein," should read -- wherein --.

Signed and Sealed this

Sixteenth Day of July, 2002

Attest:

JAMES E. ROGAN
Attesting Officer      Director of the United States Patent and Trademark Office